United States Patent
Youssef

(10) Patent No.: US 10,648,812 B2
(45) Date of Patent: May 12, 2020

(54) METHOD FOR FILTERING THE SIGNALS ARISING FROM A SENSOR ASSEMBLY COMPRISING AT LEAST ONE SENSOR FOR MEASURING A VECTOR PHYSICAL FIELD WHICH IS SUBSTANTIALLY CONSTANT OVER TIME AND IN SPACE IN A REFERENCE FRAME

(71) Applicant: MOVEA, Grenoble (FR)

(72) Inventor: Joe Youssef, Grenoble (FR)

(73) Assignee: Movea, Grenoble (FR)

( * ) Notice: Subject to any disclaimer, the term of this patent is extended or adjusted under 35 U.S.C. 154(b) by 440 days.

(21) Appl. No.: 15/445,777

(22) Filed: Feb. 28, 2017

(65) Prior Publication Data
US 2017/0248423 A1 Aug. 31, 2017

(30) Foreign Application Priority Data
Feb. 29, 2016 (EP) .................................. 16305230

(51) Int. Cl.
*G01C 19/5776* (2012.01)
*G01C 17/38* (2006.01)
(Continued)

(52) U.S. Cl.
CPC .......... *G01C 19/5776* (2013.01); *G01C 17/38* (2013.01); *G01C 21/08* (2013.01); *G01C 21/16* (2013.01)

(58) Field of Classification Search
CPC .... G01C 19/5776; G01C 21/16; G01C 17/38; G01C 21/08
See application file for complete search history.

(56) References Cited

U.S. PATENT DOCUMENTS

| | | | |
|---|---|---|---|
| 9,024,772 B2* | 5/2015 | Wang | G01C 21/165 340/686.1 |
| 2012/0283856 A1* | 11/2012 | Caritu | G01C 22/02 700/91 |

(Continued)

*Primary Examiner* — Mischita L Henson
(74) *Attorney, Agent, or Firm* — Bay Area Technology Law Group PC

(57) ABSTRACT

A method for filtering the signals arising from a sensor assembly (EC) comprising at least one measurement sensor for measuring a vector physical field which is substantially constant over time and in space in a reference frame, said sensor assembly (EC) being tied in motion to a moving frame, moving in the reference frame, the method comprising the steps consisting in:

Figure 1:
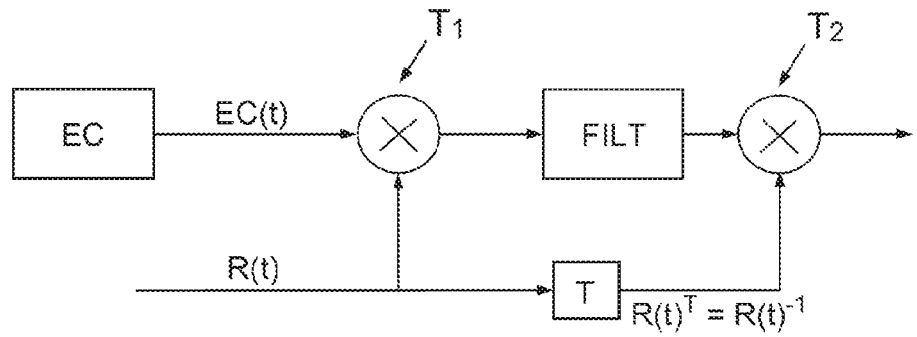

applying a first transformation (T1) to the measurements of a measurement sensor of the sensor assembly (EC) which are provided in the moving frame, to a pseudo reference frame, with the aid of a first change-of-frame operator (R(t)) by rotation between the moving frame and the pseudo reference frame; and applying a filtering (FILT) to the measurements thus transformed in the pseudo reference frame; and applying a second transformation (T2), the inverse of said first transformation, to the measurements filtered by said filtering (FILT), from the reference frame to the moving frame, with the aid of a second change-of-frame operator ($R^{-1}(t)$) by rotation between the pseudo reference frame and the moving frame, the inverse of said first operator (R(t)).

18 Claims, 6 Drawing Sheets

(51) Int. Cl.
*G01C 21/16* (2006.01)
*G01C 21/08* (2006.01)

(56) References Cited

U.S. PATENT DOCUMENTS

| | | | | |
|---|---|---|---|---|
| 2013/0324890 A1* | 12/2013 | Youssef | .................. | A61B 5/11 600/595 |
| 2013/0338961 A1* | 12/2013 | Youssef | ............... | G01C 21/005 702/141 |

* cited by examiner

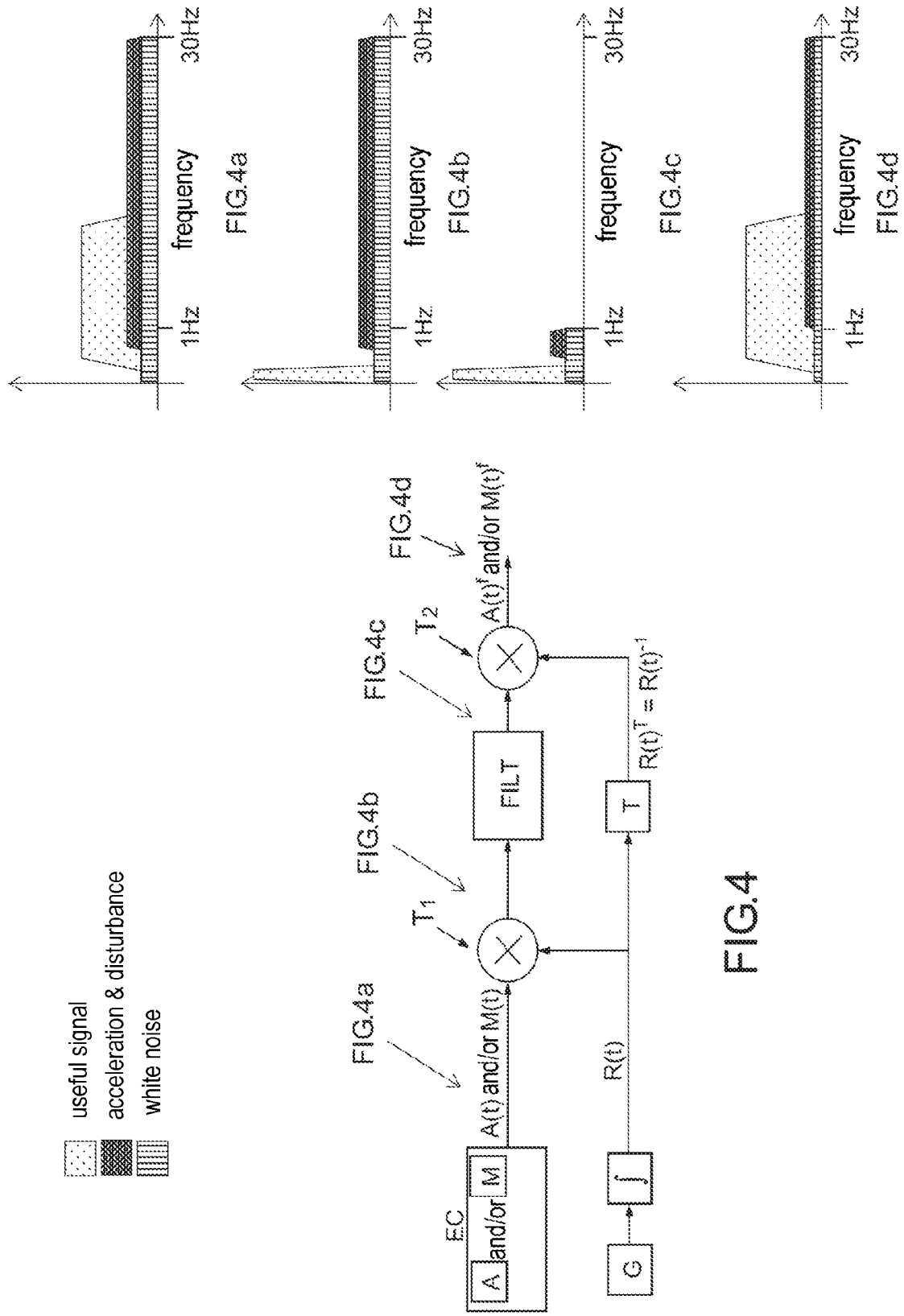

METHOD FOR FILTERING THE SIGNALS ARISING FROM A SENSOR ASSEMBLY COMPRISING AT LEAST ONE SENSOR FOR MEASURING A VECTOR PHYSICAL FIELD WHICH IS SUBSTANTIALLY CONSTANT OVER TIME AND IN SPACE IN A REFERENCE FRAME

The invention pertains to a method for filtering the signals arising from a sensor assembly comprising at least one measurement sensor sensitive to a vector physical field, which may also be termed a "physical vector field," which is substantially invariant in space and over time in a frame of reference tied to the Earth, i.e. in a reference frame EF for "Earth Frame". Stated otherwise, the invention makes it possible to reduce or separate the undesired contributions to the signal or measurements sensed by such a measurement sensor, that is to say the contributions which are added to the physical field. It is, for example, intended to be applied to the measurement of the physical gravity field generated by the Earth, sensed by an accelerometer fixed to a moving platform, endowed with a frame BF for "Body Frame", for example, or to the measurement of the physical field of the magnetic field generated by the Earth and sensed by a magnetometer fixed to a moving platform, as another example.

Such a method is useful notably in the sector of inertial measurement units, in which sector the engineer is concerned with creating devices for measuring the orientation of objects in space, based on the measurement of physical fields, such as gravity or the terrestrial magnetic field. The objective is then to provide the orientation of the object with its frame BF in the reference frame EF.

By extension, the invention is also intended to be applied to the filtering of the signal arising from a sensor for measuring a physical field whose behaviour in space and over time is known a priori. Thus, if the physical field has a behaviour which is known a priori, for example through knowledge of a model of this behaviour over time and in space, the invention can be applied.

Numerous devices, such as mobile telephones or smartphones, touch tablets, portable computers, games joysticks, remote controls with motion sensors, devices with sensors for measuring human movement and intended for physical activity monitoring applications, be they aimed at the mass market (electronic bracelets, instrumented interactive spectacles, sensors for shoes), sports or medical market, or receivers of satellite navigation systems, make use of onboard sensors, such as magnetometers, accelerometers, gyrometers, or else directional antennas (for Direction Of Arrival or DOA measurements).

In all these devices, one of the basic functions required by many applications is the measurement of the orientation or of the attitude of the object on-board which the sensors are embedded, in a frame tied to the Earth. The constraints to which the designer is subject are the cost, both in terms of hardware and in terms of electrical consumption. The service function requested is to provide the most efficacious possible measurement of the attitude of the object, by effectively filtering the "parasitic" contributions incorporated in the signals arising from the sensors and due to the fact that the sensors and the system on-board which they are embedded exhibit certain defects (they are called "endogenous" noise), or to the very nature of the physical measurement performed (the noise will then be called "exogenous").

The present invention proposes a scheme which is effective both from the point of view of metrology (science of measurements and its applications) and from the point of view of the amount of necessary calculations, of filtering of the measurements arising from a sensor of a physical field, such as the terrestrial gravity field, or the terrestrial magnetic field (hence measured respectively by an accelerometer and a magnetometer).

The present invention also makes it possible, by virtue of a step of separating the signals into a contribution due to the physical fields and a contribution due to the disturbances (inherent accelerations, magnetic disturbances, endogenous noise), to estimate the orientation of an object (endowed with its frame BF) in a user frame of reference (generally a frame tied fixedly to the Earth and made up of a horizontal plane and of a vertical direction, denoted here EF), the orientation being for example materialized by a rotation matrix, a quaternion, angles according to one of the Euler or Cardan conventions, the object being imbued with a rotation and/or translational motion, and therefore subjected, according to its motions, to an inherent acceleration and potentially to magnetic disturbances (unknown variations about a substantially uniform field in the frame of reference tied to the Earth EF in the close environment and constant over time), and to a device implementing such a method.

As mentioned previously, estimation of the orientation makes it possible to solve a whole class of problems and to supply numerous applications, such as games for which the motion of the object is used for purposes of interaction between the universe of the game and the user, augmented reality for which the orientation of the object is necessary for rendering augmented reality, the functions for controlling a cursor on the screen with the aid of the instrumented object, geographical charting and pedestrian navigation functions for which one of the basic functions is the measurement of the orientation of the instrumented object, accessories, such as instrumented bracelets, or sensors worn on the foot for stride analysis, etc.

The function for estimating the attitude on the basis of motion sensors is generally carried out on the basis of accelerometers, magnetometers and gyrometers. On account of the central nature of the function for estimating the attitude and its presence in most motion measurement applications, it is advantageous to reduce the electrical consumption thereof while affording improved metrological performance.

Obtaining the orientation of an object generally requires the implementation of several sensors, making up part of an assembly referred to as a sensor assembly, motion capture device, or attitude measurement unit.

Electromechanical microsystems or MEMS sensors (the acronym standing for "Micro-Electro-Mechanical Systems") can be used to constitute this measurement unit, they exhibit the advantage of not being very bulky, and of low cost and low electrical consumption. These components can be combined with calculation modules and embedded in a System On Chip, combining sensors and calculation capability.

The sensor assembly offering such a combination of MEMS sensors is often referred to by the initials IMU standing for "Inertial Measurement Unit". An attitude measurement unit comprises the sensors (for example accelerometer, magnetometer and gyrometer) as well as processing (calculation) means necessary for determining the attitude. The magnetometer is not properly speaking an "inertial" measurement sensor in contradistinction to the accelerometer or to the gyrometer, however it will be considered that the term "Inertial Measurement Unit" can encompass in its broadest definition a magnetometer. The calculation means can be separated from the box comprising the sensors or included in the box. The employment of such MEMS sensors makes it possible to envisage the use of attitude measurement units in varied, mass-market, application sectors, such as games, augmented reality, movement-based man-machine interfaces, the biomedical sector, tracking (monitoring) of physical activities, functional re-education, the analysis of sportspersons' movements, the automotive, robotic, and three-dimensional animation sectors and more generally in any sector in which it is sought to determine or to observe movement.

However, with respect to non-MEMS sensors or MEMS sensors that are not, however, intended for the general mass market (notably sensors of conventional manufacture, not arising from micro-technologies and used for example, in the navigation sector), these MEMS sensors, notably those which form the subject of efforts for significant miniaturization, are very inexpensive, manufactured in large batches, but have the drawbacks of being relatively less efficacious, noisy and biased.

According to principles known to the person skilled in the art such as TRIAD (TRI-axial Attitude Deformation) or QUEST (Quaternion ESTimator) and all the derived schemes, it is advantageous to build attitude or orientation measurement solutions based on the measurement of two non-collinear vector physical fields, i.e. a first vector field and a second vector field in a frame tied to the solid endowed with its frame BF, of substantially constant directions in a reference frame EF or fixed with respect to EF. The measurement of the directions of these physical fields in the frame tied to the solid BF, by suitable sensors, makes it possible to provide the orientation of the frame of the solid with respect to the fixed frame EF. The two physical fields usually harnessed are the terrestrial gravity field and the terrestrial magnetic field. It is very simple, when two decompositions of these two fields are available, along the three axes of a moving entity in motion (according to the frame BF), to determine the orientation of the moving entity with respect to the Earth, that is to say the orientation of the frame BF with respect to the frame EF. An important advantage of the invention is therefore, in this regard, to effectively filter the physical fields so as to isolate them from the disturbances which add to them during measurements thereof via the sensors. It is thus possible to calculate the attitude on the basis of the data filtered by the method of the invention in an effective manner. The sensors very conventionally used to measure these physical fields which are of interest for attitude measurement are accelerometers and magnetometers.

An alternative as replacement for such sensors for measuring physical fields is to use gyrometers or gyroscopes of high precision, with low drift, and to provide an initialization of the attitude or a resetting from time to time. Indeed, the rotation speed measurement provided by a gyrometer, makes it possible, through a time-integration operation, to retrieve the orientation of the moving entity to which the sensor is attached. However, this orientation is on the one hand determined to within a constant, since the sensor delivers rotation speeds and does not provide the position in terms of rotation itself, and is subject to the quality of the noise and notably of the bias of the gyrometric sensor which becomes all the more significant in regard to the quality of the final result as the integration operation considerably amplifies the bias effects, in a manner proportional to time.

Concerning systems based on measuring two physical fields, they then naturally comprise a first triaxial sensor and a second triaxial sensor, both fastened to the solid, for measuring the components of the physical fields respectively, along the axes of the sensors fixed to the solid, therefore in the frame BF, and means for determining the rotation matrix of the solid in said fixed frame EF. If the physical fields are effectively constant over time and in space tied to the fixed frame of reference EF (for example a frame tied to the Earth), and if the sensors provide faithful representations of these physical fields, it is then easy to calculate an orientation according to known schemes by calculating the representation of the orientation of the solid by composition of the two measurements of physical fields using an algorithm of the TRIAD or QUEST type. These algorithms exhibit the advantage of being simple and therefore present themselves as very beneficial candidates for satisfying the cost and electrical consumption constraints. However, the measurements of the physical fields are frequently perturbed by disturbances which add to the physical fields and the use of the TRIAD or QUEST schemes are then rendered difficult. It is then appropriate to filter or separate the physical fields from the other contributions, before being able to apply these techniques. This is what the invention makes it possible to do, in an optimal manner.

Two physical fields are present on the Earth and can be employed to apply these techniques, the terrestrial gravity field and the Earth's magnetic field.

For the terrestrial gravity field, models which are simple in terms of direction and intensity are available. For most applications, the terrestrial gravity field is considered to be oriented along the vertical of the place where the solid is present and its norm can be considered to be constant on the Earth. This is notably the case for the mass-market sensors envisaged. However, sensors for the terrestrial gravity field are based on the principles of acceleration measurements and, as soon as the sensor is set into motion in the terrestrial frame of reference, the sensor measures the contributions from the gravity field, but also the contributions due to the motions themselves of the solid that carries the sensor. These contributions are called inherent accelerations. These contributions are of the same nature, they are both accelerations. The so-called inherent accelerations are due to the rotational motions of the solid (which rotation generates centrifugal and centripetal accelerations at the sensor measurement point) and to the translational motions of the solid. The second derivatives with respect to time of the position coordinates of the solid constitute inherent accelerations and are measured by the sensors. These inherent accelerations are exogenous contributions. They are not due to a sensor technology defect but since they are of the same nature as the acceleration due to gravity, they too get added during the measurement. It is thus noted that through the nature of the measurement, for solids in motion, via an acceleration sensor, it is not possible to access a measurement of the terrestrial gravity field which is an example of the contributions due to the inherent accelerations. The proposed invention makes it possible to separate these contributions due to inherent accelerations from the measurement of the terrestrial gravity field.

It is important to note here that known filterings, for example simple frequency-based filterings, are not able to separate the contributions from gravity and from inherent accelerations. Indeed, for example, a solid in rotation furnished with a vector accelerometer measures the contribution from gravity and the contribution from the centripetal and centrifugal accelerations and these two contributions generate signals which are by nature in one and the same frequency band, since they are both generated by the same rotational motions. On the one hand, assuming that there is no inherent acceleration (this being a fiction, this would assume a pointlike vector sensor with rotational motions impressed on the solid with the instantaneous rotation axis passing through the pointlike sensor), the rotational motions in the gravity field generate signals equal to the projection of the gravity field on the axes of the accelerometer, which indeed generates signals whose frequency behaviour is tied to the frequency behaviour of the rotational motions. On the other hand, the inherent accelerations are themselves induced by the rotational motion impressed on the object (centripetal and centrifugal contributions, translational acceleration) and therefore exhibit a frequency behaviour tied to the frequency behaviour of the rotational motions impressed on the object. The low-pass filtering schemes applied to the signals in the frame of the object BF are therefore ineffective. At the very most, over long durations, it may be hoped that the average contribution of the inherent accelerations reduces to zero, whilst that from gravity accumulates.

Concerning the terrestrial magnetic field, models of the main field are also well known (WMM or IGRF for example). Within the framework of an attitude measurement unit function, for which it is desired to determine the orientation with respect to the terrestrial frame, it is indispensable to employ this field as a supplement to the gravity field since, except at the Earth's magnetic poles, this second natural physical field is not collinear with the gravity field. Hence, its measurement, jointly with the measurement of the gravity field, makes it possible to apply the schemes cited previously (TRIAD or QUEST) or derived schemes. A single physical field does not make it possible to completely determine the orientation of a moving entity in the terrestrial frame. Indeed, all the rotations about the axis of the physical field leave the measurements invariant. Giving only the gravity does not make it possible to ascertain the heading of the moving entity, but solely its inclination with respect to a horizontal. The same holds if only the terrestrial magnetic field is given, since all the rotations about the axis of the terrestrial field leave the measurements invariant.

However for reasons explained hereinbelow and different from those relating to the gravity field, the measurements of the Earth's main magnetic field that it is possible to sense with a magnetometer fastened to the mobile object are also disturbed. Indeed, it is known that, in contradistinction to the gravity field, even for orders of magnitude of precision similar to that of accelerometers, the terrestrial main magnetic field depends on where one is situated on Earth, both in terms of norm and inclination (angle formed between the direction of the magnetic field and the horizontal) and in declination (angle formed between the direction of the geographical North pole and magnetic North (it is therefore an angle on the horizontal plane of the observation point). It is nonetheless possible to utilize it by considering that the attitude measurement unit provides its orientation with respect to local magnetic North, that thereafter can thereafter be corrected simply, since the magnetic declination of the terrestrial magnetic field is known at the spot where one is situated on Earth.

Over and above this first problem that can be circumvented relatively readily, the physical field that is found at the place of the measurement is moreover not only composed of the Earth's magnetic field (main field) which is well known, but also of the magnetic contributions from objects, small or large, which themselves generate magnetic fields which contribute to the ambient field. These magnetic disturbances contribute to the creation of a field participating in the ambient field, this field being constant over time, if the objects generating the magnetic field remain fixed (both in space, therefore motionless and in terms of magnetic properties). According to the laws of magnetostatics, these contributions are all the greater the closer one is to the object. Thus, residential buildings, accommodation, offices, houses, etc. notably fitted with metallic structures are magnetic field generators. Hence, the ambient magnetic field is no longer truly invariant in space and it is difficult to ascertain these fields. As a compass may be disoriented in the presence of these disturbing fields, an attitude measurement unit based on measuring the magnetic field, which would not take account of these disturbances, could provide a different direction of magnetic North from terrestrial magnetic North.

If a mapped datum of these fields is available, which would require significant measurement campaigns, it is possible to take account thereof in the invention.

To summarize, the ambient magnetic field consists on the one hand of the terrestrial main field, which is well known, and which, for limited displacements in space, can be considered to be invariant (in space and also over time) in the terrestrial frame, and on the other hand by magnetic disturbances due to the objects (small or large) which constitute our environment. According to the knowledge that one has of the ambient magnetic field, for example by way of a mapping, the invention applies in the same manner. It is for example possible to consider that only the main magnetic field is known, that it is constant in space and over time, having regard to the scenarios of use in which the invention must be applied. It is also possible to consider a space-varying magnetic field model, either because the scenario of use provides for large displacements on the Earth, or because a fine mapping is available of the ambient field at a given place.

In the most commonplace cases, currently, lack of availability in practice of precise ambient field models which are representative of the short-range spatial variations of the magnetic field which are due to the objects of our environment, an ambient field model is frequently considered to be constant in space and over time to which the unknown disturbances are added. It is thus conceived that if the solid moves in space and experiences variable fields, the reference of the magnetic field is no longer appropriate, and it needs to be processed correctly, this being what the invention proposes. Thus for example, large variations of the ambient field in space which are due to the relative transit of a magnetized object and of the solid equipped with the magnetic field sensors whose orientation it is desired to ascertain must be filtered, this being what our invention allows.

Any field which does not comply with the known model must be filtered, this being what the invention allows. It should be noted that, in contradistinction to an accelerometer, the measurement of the magnetic field by a magnetometer does not depend on the motions impressed on the solid carrying the measurement sensor. There is, as was noted hereinabove on the accelerometer, no field contribution created intrinsically by motion. On the contrary, it is very obvious that the rotational motions impressed on the mobile object furnished with a vector magnetometer sensor generate signals that may vary over time, with a frequency behaviour related to the impressed motions, whether this be for the contribution of the terrestrial main field or for the contribution due to disturbances.

It should also be noted that within the framework of an "urban" or "industrial" or "transport" environment or even within the framework of residential housing, the instrumented solid is potentially subjected to electromagnetic fields which may disturb the measurements momentarily or more lastingly, through pollution of the bandwidth in which the measurement of the magnetic field is made.

The invention makes it possible to effectively reduce the contribution of the magnetic disturbances of the measurement, and thus to isolate the main magnetic field. The latter can then be utilized to determine the attitude of the object carrying the sensors.

For the measurement of human movements, the bandwidth generally necessary is from a few Hertz to a few hundred Hertz, if it is desired to sense tremors, shocks, vibrations or movements of objects imparted by the human body, such as a tennis racket, a golf club etc. It is thus commonplace to adjust the sampling frequencies of the sensors to 50, 100 or 200 Hz, so as to capture the desired bandwidth for the human movement.

Moreover, on account of the imperfect nature of the sensors, endogenous extra noise (defined as due to the sensors themselves or due to the electronic system constituting the measurement system) is added to the measurement and also contributes to errors.

The endogenous noise of the sensors consists for example of a thermal noise contribution due to the electronic hardware components. This endogenous noise gets added to the measurement of the sensor, according to a specific behaviour. The noise may be white (perturb the various zones of the spectrum in the same manner) or coloured (perturb the low or the high frequencies more). It is generally modelled as a random, white or coloured, phenomenon. Any sensor also exhibits a bias (i.e. the sensor delivers a non-zero value called bias, even were it immersed in a zero field), this also having to be taken into account.

The attitude calculation techniques being based on these gravity and magnetic physical fields are therefore penalized by the presence, in the measurements of the accelerometers and magnetometers, of these extra contributions to the Earth's gravity field and magnetic field. Several techniques are known for eliminating these disturbances as far as possible. We have seen that the schemes for frequency filtering of the signals generated by the sensors cannot effectively isolate the contributions from the physical fields and from their disturbance. The most efficacious techniques implement gyrometers. These sensors measure the rotation speeds of the solid to which they are attached and thus afford an item of information about the time derivative of the attitude of the solid. This item of information is complementary to the measurements of acceleration and magnetic field. These sensors exist in a low-cost, low-consumption version, and are widespread in mass-market devices. The underlying idea is that the accelerometric and magnetometric sensors deliver an item of information close to the physical field sought during the motionless or quasi-motionless phases, and that then it is possible to calculate an orientation of the moving entity in the frame of the Earth EF whilst the gyrometer for its part makes it possible to calculate variations of the orientation of the moving entity (and solely variations), during the dynamic motion phases.

A gyrometer is often present in platforms utilizing an accelerometer and/or a magnetometer, since it is a sensor which delivers an item of information of a complementary nature to these other two sensors, also, this item of information is generally already available. Thus, most mobile telephones, tablets, remote controls with motion measurement, games joysticks, devices for analyzing movement for health, or devices for analyzing sports movements, are equipped with gyrometers, accelerometers and magnetometers.

This trio A, G, M, respectively for accelerometer, gyrometer and magnetometer, is thus customarily present in these mobile devices. For many functions, such as measuring the orientation of the device in the terrestrial frame, it is by combining the information measured by this trio of sensors that it is possible to provide a precise, robust, attitude measurement capable of delivering attitudes in fast motion mode. Thus, the attitude measurement units embedded aboard mobile telephones now customarily consist, in hardware terms, of an accelerometer, a magnetometer and a gyrometer. Just as for magnetometers and accelerometers, miniaturization technologies make it possible to provide these gyrometers in bulk, at lower cost and for reasonable electrical consumption. For a growing list of functions, the three sensors, accelerometer, magnetometer and gyrometer, are activated at the same time, since all participate through the nature and quality of the information that they deliver to the construction of elaborate functions, such as for example the attitude. The invention proposed here makes it possible, in an advantageous embodiment, to combine in an optimal manner the signals of a gyrometer with those of an accelerometer and/or of a magnetometer, so as to carry out in an optimal manner the filtering of the physical gravity fields and/or of the terrestrial magnetic field. The invention can also be used to isolate the inherent accelerations and/or the magnetic disturbances.

As shown by the prior art in attitude calculation techniques, for a solid whose position is stationary or slowly varying over time, the positions attained thus hardly generating any inherent accelerations, and within the framework of an ambient field which is hardly disturbed with respect to the Earth's main field, the combination of accelerometer A and magnetometer M makes it possible to determine the attitude of the solid. During more accelerated motions, which contribute inherent accelerations and which potentially cause the solid to pass through spatial variations of the magnetic field, the gyrometer can take over while the accelerometric and magnetometric data are rendered unreliable. The gyrometer is thus used as provider of data supplying techniques that may be referred to as techniques for "interpolating" between two reliable orientations provided by the accelerometer and/or the magnetometer. These techniques therefore consist in placing more trust in the measurements of the rotation speeds (delivered by the gyrometer) during the dynamic phases of motion (which generate inherent accelerations), or during the phases of measuring disturbed magnetic fields, and on the contrary, in placing more trust in the measurements of the accelerations and/or magnetic fields during the phases that are more stationary or devoid of magnetic disturbances. The present invention utilizes all the information present in the accelerometric, magnetic and gyrometric signals to isolate in an optimal manner the gravity fields and/or the terrestrial magnetic field.

Several known schemes exist for obtaining, on the basis of measurements provided by accelerometers, magnetometers and gyrometers, an estimation of the orientation of the object. There exists notably fusion schemes for merging the measurements arising from the three sensors, implementing an observer or calculator, which make it possible to fuse a double item of information: that originating from the measurements provided by the sensors and that originating from an evolution model, while maintaining a calculation time which is compatible with a real-time implementation on relatively powerful processors (PC, Smartphone, Tablet). It should be noted that these calculation techniques are compatible with low-consumption microcontrollers intended for even more rudimentary devices such as portable bracelets, interactive spectacles, instrumented shoes. However, the quest for lower consumption drives constant attempts to reduce this cost factor, notably so that the calculation cost of the calculation function remains "small", the objective being "negligible" relative to the consumption of the other functions of the device. Lowering this calculation footprint exhibits two beneficial effects, both for the duration of operation of the device between two recharges, and for the cost and weight, seeing that the battery is less important, less heavy and less expensive, and that the processor is smaller and therefore less expensive.

The known schemes implementing an observer or calculator rely generally on the use of a Kalman filter. The advantage of this technique is to allow the fusion of the data while taking account of the quality of the information afforded by the measurements provided by the sensors and of the quality of the evolution model for the kinetic states. Among the various types of Kalman filter, the extended Kalman filter (EKF) is particularly used; the latter is fast and simple to implement, one of its applications to motion capture is notably described in the document "Quaternion-based extended Kalman filter for determination orientation by inertial and magnetic sensing", SABATINI A. M., IEEE Transactions on Biomedical Engineering, 2006, 53(7).

In addition to the choice of the filter, the quality of the measurements injected into the filter is of great importance, and notably the confidence accorded to their value.

Indeed, as mentioned previously, the measurements comprise an informative part directly related to the orientation of the object in motion and a disturbing part whose nature depends on the sensor considered. To first order, this entails inherent accelerations for the measurements provided by the accelerometers, and magnetic disturbances for the measurements delivered by the magnetometer. It would be possible to incorporate the defects of the sensors, notably the noise and the biases for the gyrometers and the magnetometers.

Several schemes exist for dealing with disturbances. It is notably possible to disregard the disturbed measurements, but in the case where the measurements of several sensors simultaneously exhibit a disturbance, and even if these disturbances are correctly reported to the observer, in the form of a "large" uncertainty value associated with the measurement, the observer no longer has enough information to propose a correct estimation of the orientation. It is also possible to include a representation of the disturbances in the vector and the state model of the Kalman filter so as to estimate them jointly with the parameters of the attitude of the solid. However, joint estimation of the disturbances and of the attitude turns out to be tricky on account of a lack of observability. Furthermore, it requires the adjustment of a large number of parameters, thereby complicating its implementation.

These drawbacks are dealt with diversely by the existing solutions. International patent application WO2010/007160, the applicant of which is co-proprietor, offers a method for estimating orientation providing a precise estimation of the orientation, in the presence or not of inherent accelerations and of magnetic disturbances. The previously stated aim is achieved by a method for estimating orientation on the basis of measurements, along three axes in space, of the acceleration, of the magnetic field and of the rotation speed, comprising:

a step of preprocessing these measurements to detect the existence of a disturbance and to estimate undisturbed measurements, and a step of estimating the orientation on the basis of the values of measurements arising from the preprocessing step.

This method exhibits however the drawback of requiring the use of a significant calculational power. It exhibits above all, from the metrological point of view, the detection of the existence of the disturbances remains rudimentary and the technique for estimating the undisturbed measurements is empirical. The detection of the disturbances is generally done on the basis of the observation of the calculation of the modulus of the measured field. In the undisturbed case, the gravity field and the main magnetic field exhibit a constant modulus equal to the value of the gravity field (i.e. 1 G, or about 9.81 ms$^2$) and to the value of the modulus of the main magnetic field (which depends on the location of the measurement on the Earth, for example 45000 nT at the position of the town of Grenoble). When disturbances are added thereto (inherent accelerations or disturbance field additional to the terrestrial field), the modulus is no longer constant. This technique makes it possible to detect the disturbances and to thus to manage the confidence accorded to the accelerometric and magnetometric data. This technique is applicable to objects in motion, since the modulus of the measurement does not depend on the orientation of the sensor, and it can therefore be calculated at each instant.

However, it is a rudimentary technique by comparison with the proposed invention since it relies only on a behavioural model of the norm of the signals.

In the quest for the cost/performance ratio, document FR 2976353 proposes another avenue, which proposes relying on the calculation schemes of the QUEST or TRIAD type to provide the attitude, no longer based on optimization techniques, but by de-noising beforehand, according to schemes close to the previous technique, the measurements of the vector fields, which are then provided as input for the calculations of QUEST or TRIAD type. The principle amounts to replacing the measurement of the field, when the measurement is perturbed by significant disturbances, by a prediction of this field measurement, this prediction being carried out with the aid of the measurements provided by a gyrometer. This scheme is beneficial, it falls short, however, on the detection of the disturbances and on the utilization of this detection for the de-noising of the vector fields. Indeed here the de-noising is on the one hand always based on considerations of detection of the disturbances carried out in the frame of reference of the sensors, which does not utilize all the knowledge that one has about the physical fields, which are indeed substantially constant in terms of norm, this being easy to utilize whatever the frame and therefore valid in the frame of the object, but also for each of their components, this not being utilized by this invention of the prior art, and on the other hand, the scheme preferentially described assumes abrupt replacement of the field measured during disturbance by its prediction carried out with the aid of the gyrometer, which augurs non-smooth behaviours.

The present invention proposes an original de-noising scheme which utilizes all the knowledge, beyond the simple detection of the disturbances based on the norm over the physical fields that it is sought to denoise. Indeed, the invention utilizes completely the a priori knowledge of the physical fields which are constant over time and in space at the level of the vector components individually and not only globally in terms of norm.

An aim of the invention is to propose an efficacious scheme that consumes little in terms of calculations, for de-noising vector fields, by utilizing measurements provided by a gyrometer.

Hence, there is proposed, according to an aspect of the invention, a method for filtering the signals arising from a sensor assembly comprising at least one measurement sensor for measuring a vector physical field which is substantially constant over time and in space in a reference frame EF, said sensor assembly being tied in motion to a moving frame BF, moving in the reference frame, the method comprising the steps consisting in:

applying a first transformation to the measurements of a measurement sensor of the sensor assembly which are provided in the moving frame, to a pseudo reference frame QEF, with the aid of a first change-of-frame operator by rotation between the moving frame BF and the pseudo reference frame QEF;

applying a filtering, which may also be termed "applying a filter," to the measurements thus transformed in the pseudo reference frame; and applying a second transformation, the inverse of said first transformation, to the measurements filtered by said filtering, from the pseudo reference frame QEF to the moving frame BF, with the aid of a second change-of-frame operator by rotation between the pseudo reference frame and the moving frame, the inverse of said first operator.

In contradistinction to the known techniques, the invention makes it possible to utilize all the knowledge, component by component or by combining these components, of the components of the physical fields on which the orientation calculation is based, and it makes it possible to "dose" continuously the estimator of the physical field, between the two extreme situations, one for which the estimator of the physical field would be equal to the measurement arising from the sensors (that is to say when there are no disturbances) and the other for which the estimator of the physical field would be based wholly on the prediction based on the gyrometer.

The pseudo reference frame, denoted QEF for "Quasi Earth Frame", is related to the reference frame EF by a rotation which is constant or slowly drifting over time. "Slowly drifting" signifies that the bandwidth of the "slow drift" is much smaller than the bandwidth of the motions impressed on the object.

Such a method also makes it possible to greatly limit the calculations, thereby constituting an advantage with respect to the prior art of the schemes based on observers or Kalman filters which execute searches for the orientation via successive approximation based optimization techniques.

Such a method is also completely suitable for taking into account the drifts of the onboard gyrometers. The method does not consider the gyrometer to be a perfect sensor, but takes into account on the one hand the temporal drift of the orientation calculated on the basis of the measurements of a gyrometer, and also the fact that this orientation is not absolute.

Such a method makes it possible to decouple the filtering of the physical fields, thereby rendering the estimation of each field independent of the other and consequently the estimation error for each field is also independent of the other.

The method can be implemented with various combinations of sensors, that is to say A and G, M and G or AGM. Having a single method for these combinations is advantageous since a single calculation code is necessary, thereby helping with the ease of management of the code.

According to one mode of implementation, said second operator, the inverse of said first operator, when said operators are rotation matrices, are one another's transpose matrices. It should be noted that whatever representation of the rotational transformation operator is used, it is easy to determine the inverse operator without heavyweight calculations.

It is thus easy to calculate the second operator, the inverse of said first operator, at little calculational cost.

In one mode of implementation, said first operator is determined on the basis of measurements provided by a gyrometer tied in motion to the moving frame.

Thus the calculation of the operator has low calculation cost, low consumption, and is integratable on the product without other external information.

For example, said first operator can be determined by integration over time of the measurements provided by said gyrometer. According to a variant, the integration calculation may be for example executed at a greater calculation frequency than the frequency of calculation of the application of the first transformation, of the filtering, and of the second transformation.

It is possible to execute the calculations aboard a calculator, which is separate or included in the System On Chip chip. A hardware accelerator can advantageously carry out the calculation of the integration of the gyrometer signal, at a fast rate, so as to minimize the errors inherent in the integration calculation and due to the size of the time steps.

It is thus possible to reduce the amount of calculation in order to carry out the method of the invention by relying on a specific hardware accelerator without degrading the performance.

For example, said first operator can also be determined on the basis of measurements provided by an attitude measurement unit, an optical sensor, an electromagnetic sensor, or a mechanical sensor.

According to one mode of implementation, said applied filtering is adaptive.

It is thus possible to accelerate or improve the response of the filter by adapting a weighting between a speediness criterion and a quality criterion. Furthermore, this type of filtering can be iterative, recursive, thereby making it possible to reduce the memory required.

In one embodiment, said applied filtering is of high-pass type so as to extract contributions from high frequencies from the measurements transformed in the pseudo reference frame.

Thus, the method of the invention makes it possible to extract the measurements not related to the physical fields, such as the linear acceleration for the accelerometer or the magnetic disturbances for the magnetometer As a variant, said applied filtering is of low-pass type so as to extract contributions from low frequencies from the measurements transformed in the pseudo reference frame.

Thus, it is possible to extract the measurements related to the physical fields and thus to supply procedures known to the person skilled in the art such as those set forth hereinabove, with de-noised data of the inherent accelerations and/or magnetic disturbances so as to estimate the orientation of the moving entity carrying the sensors. The method described can then be followed by a step known to the person skilled in the art (such as Quest or Triad) making it possible to calculate the orientation of the moving entity endowed with its frame BF in the reference frame EF, on the basis of the data thus processed. The filtering step will then preferentially be a low-pass filtering step. The processing steps are preferentially applied to an accelerometer to obtain the inclination of the moving entity, or to an accelerometer and a magnetometer to obtain the complete orientation. It should be noted here that the orientation calculation can equally well be (since it is mathematically equivalent) carried out as an additional step at the end of the steps of rotational Transformation, Filtering, and inverse rotational Transformation, or inserted after the Filtering operation and before the inverse rotational Transformation.

According to one mode of implementation, said sensor assembly comprises an accelerometer and/or a magnetometer.

Thus, after having applied the filtering method, for example by preserving only the measurements of the physical fields (therefore preferentially with a low-pass filter), one has the necessary and de-noised information required to estimate the orientation of the sensor. The application of the filtering method to determine the inherent accelerations or the disturbances (therefore preferentially with a high-pass filter) makes it possible to determine the motion of the sensor, for example through its inherent accelerations or the magnetic environment of the sensor.

It is also possible to undertake to the two types of filtering simultaneously and thus to simultaneously obtain the measurements of the de-noised physical fields on the one hand and the values of inherent acceleration and the magnetic disturbances on the other hand.

It is possible to apply the method of the invention to just the accelerometric measurement or to the magnetometric measurement.

In one embodiment, said steps are carried out simultaneously on signals of sensors of the sensor assembly, arising from at least two measurement sensors measuring two distinct and non-collinear physical fields in the reference frame.

This makes it possible to supply a calculation of orientation of the sensor assembly with three degrees of freedom (3D).

According to one mode of implementation, the method furthermore comprises a step consisting in determining the orientation of said sensor assembly in the reference frame, by applying an orientation calculation (for example Triad or Quest) on the basis of said measurements obtained after their transformation by the steps of the first transformation, of the filtering, and of the second transformation. Said filtering is then preferentially of low-pass nature.

As a variant, the orientation calculation step can be shifted while obtaining the same result: the method can therefore furthermore comprise an additional step consisting in determining the orientation of said pseudo reference frame with respect to the reference frame, on the basis of said measurements obtained after their transformation by the steps of the first transformation and of the filtering, before applying the second transformation to the orientation thus determined by the additional step, so as ultimately to obtain the orientation of said sensor assembly in the reference frame.

Indeed, the orientation calculation thus inserted after the filtering step makes it possible to estimate the orientation of the pseudo reference frame with respect to the reference frame. The application of the second transformation (which makes it possible to switch from the pseudo reference frame to the moving frame) therefore makes it possible to obtain the orientation of said sensor assembly in the reference frame.

Indeed, to obtain the orientation of said sensor assembly in the reference frame, it is possible to insert the step of calculating the orientation, either directly after the first transformation and the filtering, the second transformation being performed after, or after the first transformation, the filtering, and the second transformation. The two formulations are mathematically equivalent.

There is proposed, according to another aspect of the invention, a system for filtering the signals arising from a sensor assembly comprising at least one measurement sensor for measuring a vector physical field which is substantially constant over time and in space in a reference frame, said sensor assembly being tied in motion to a moving frame, moving in the reference frame, comprising a calculation unit suitable for:

applying a first transformation to the measurements of a measurement sensor of the sensor assembly which are provided in the moving frame, to a pseudo reference frame, with the aid of a first change-of-frame operator by rotation between the moving frame and the pseudo reference frame;

applying a filtering to the measurements thus transformed in the pseudo reference frame; and applying a second transformation, the inverse of said first transformation, to the measurements filtered by said filtering, from the pseudo reference frame to the moving frame, with the aid of a second change-of-frame operator by rotation between the pseudo reference frame and the moving frame, the inverse of said first operator.

The calculation method can be implemented aboard a system on chip comprising the sensors and a calculation unit, aboard a calculation unit embedded aboard the moving entity or even in an off-board manner, the signals being transmitted from the mobile unit or to the off-board calculation unit by communications means. These communication means can call upon radio or more generally wireless techniques.

Figure 2:
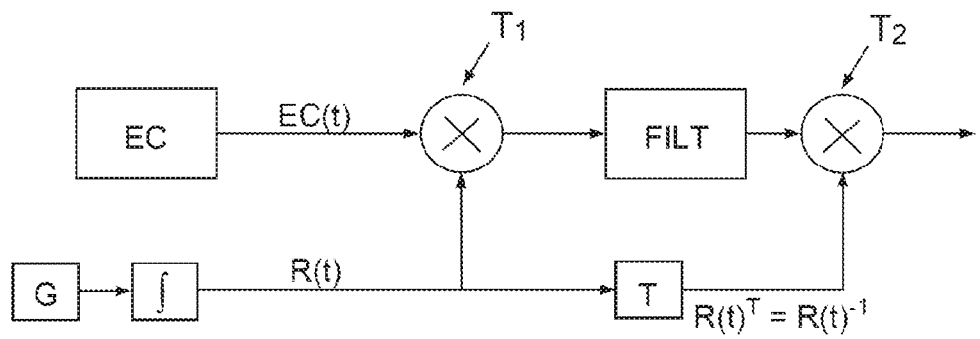
Figure 3:
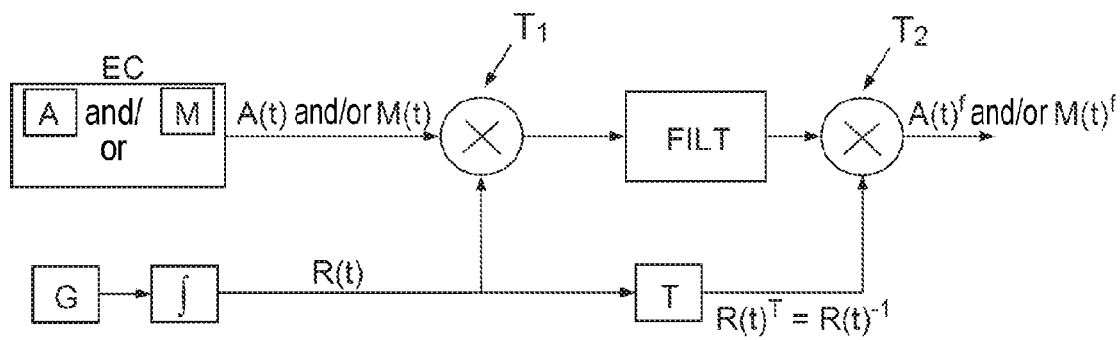
Figure 6:
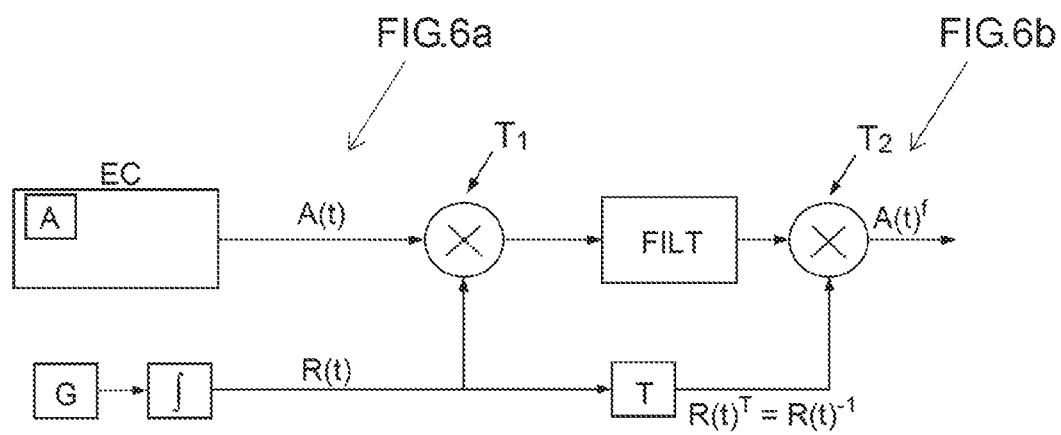
Figure 6:
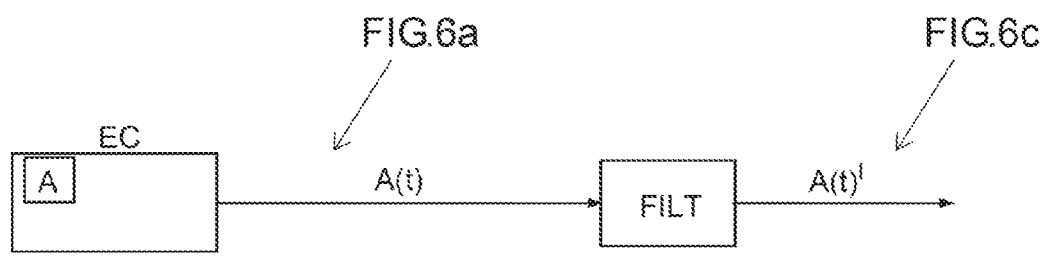

The invention will be better understood on studying a few embodiments described by way of wholly non-limiting examples and illustrated by the appended drawings in which:

FIG. 1 schematically illustrates a method and a system according to an aspect of the invention;

FIG. 2 schematically illustrates a method and a system of FIG. 1 according to an aspect of the invention using measurements of a gyrometer to determine the first operator;

FIG. 3 schematically illustrates a method and a system of FIG. 2 according to an aspect of the invention, in which the sensor assembly comprises an accelerometer and/or a magnetometer;

FIGS. 4, 4a, 4b, 4c and 4d schematically illustrate the frequency behaviour of the signals in the various steps according to a method and a system of FIG. 3 according to an aspect of the invention, with the evolution of the frequency behaviours of the acceleration signals in the course of the steps of the method; and FIGS. 5, 5a, 5b, 5c and 5d schematically illustrate the temporal behaviour of the signals in the various steps according to a method and a system of FIG. 3 according to an aspect of the invention, with the evolution of the temporal behaviours of the acceleration signals in the course of the steps of the method;

FIGS. 6, 6a, 6b and 6d schematically illustrate the results of the invention compared with the results of the prior art of FIGS. 6', 6a, 6c and 6e. They demonstrate the advantage of the invention in transforming firstly the signals measured in the frame of the sensor into a pseudo frame of reference tied to the Earth and then filtering them, instead of filtering them directly in the frame of the sensor; and FIG. 7 schematically illustrates a system according to an aspect of the invention.

In all the figures, elements having the same references are similar.

The filtering scheme proposed in the present patent application relies on the properties of the measured physical field. In its greatest generality this physical field takes the form of a vector field varying in space and over time in a reference frame EF for "Earth Frame" or pseudo reference frame QEF for "Quasi Earth Frame". The frame QEF is a frame tied to the reference frame by a rotation transformation which is constant or slowly varying with time. By "slowly" is meant a rotation whose dynamics are small compared to the "fast" motions potentially impressed on the mobile object carrying the sensors. For the terrestrial magnetic field or the terrestrial gravity field, this reference frame is fixed with respect to the Earth. For the applications considered, having regard to the time scales (from a few seconds to a few hours or days), the space dimensions considered (from a few centimetres to a few kilometres), and having regard to the resolutions of the sensors employed (at best, a thousandth or ten thousandth of the terrestrial field for sensors from the mass-market range, more generally a hundredth), the physical field exhibits characteristics of stability in its spatial or temporal variations in a reference frame tied to the Earth. The temporal variations are generally negligible compared to the intensity of the main field (defined as the contribution, constant over time and in space, of the physical field for the time data and space data of the scenario considered), and the spatial variations are generally of small amplitude compared to the intensity of the main field.

It should be noted further, however, that if better knowledge of the physical field is provided, that its spatial and temporal variations for example are known through a mathematical model for example, the invention remains applicable. It would then suffice to compare the measured value transformed in the reference frame with this mathematical model, for example by forming a component-wise difference and to apply the remainder of the invention.

In the subsequent description, the fields generally considered are the gravity fields or the terrestrial magnetic field, and the corresponding sensors are respectively an accelerometer A and a magnetometer M. In a nonlimiting manner, the invention can, for example, also apply to any, artificial or natural, physical field present in the environment and for which a suitable sensor is available.

For applications considered, the magnetic field constituted at the surface of the Earth has as essential contributor the natural magnetic field of terrestrial origin. It is spatially continuous and exhibits only very slow spatial and temporal variations on the scale of the usual scenarios.

Indeed, on the scale of the dimensions of the Earth, and away from essentially urban ambient contributors (buildings, vehicles, pipelines, furniture etc.), the spatial evolution of the three components of the natural magnetic field is only a few nanoTeslas per kilometre for a typical value of norm in France of 45 000 nT.

The temporal evolution of the terrestrial magnetic field is on the geological time scale. At the very most, a slow variation in the direction of the field in the course of years and centuries can be observed. Moreover, the resolution of the sensors implemented, notably for the mass-market applications considered, means that the temporal magnetic signal arising from the geomagnetic activity (of solar origin) which adds to the natural terrestrial magnetic field can be neglected.

For smaller scales and in an environment which is more urban or typical of human activity, the spatial anomalies due to the environment may, however, be much more significant. This environment contributes to adding to the natural contribution of the terrestrial field a second field contribution, still predominantly constant over time, but exhibiting faster spatial variations than those of the terrestrial magnetic field. The objects present in an environment which is generally correlated with human activity or presence behave as so many small contributors to the ambient field which add their contributions to the terrestrial natural field. This therefore goes for buildings, potentially consisting of ferromagnetic materials, vehicles, etc. A model which is generally employed models the intensity of their effect in terms of amplitude as inversely proportional to the distance from the measurement point to the field-generating object, to the power two or three. The effect can be significant for a measurement in immediate proximity to the object, but it decreases rapidly with distance and tends to wane relative to the intensity of the terrestrial field.

Devices based on magnetic field sensors or magnetometers are generally employed for the purposes of measuring the orientation of the device with respect to the terrestrial frame EF. Thus it is the Earth's natural magnetic field that represents the signal of interest. In the customary cases, the displacements are limited to the capabilities of the carrier of the sensor. In the case of an attitude measurement unit aboard a mobile telephone, a touch tablet, a remote control (for a game, for the control of a media centre by movement), for example, the sensor assembly can be displaced very locally, within a span of a few metres. The most significant displacements, representative of pedestrian mobility contexts, are of the order of a few hundred metres to a few kilometres. For indoor displacements, it should be noted that the mobile device is generally carried by its user, who stands some distance from the most significant magnetic sources (floors, walls, furniture elements, . . . ). For games scenarios, or scenarios of navigation in 2D or 3D computing contents, the displacement is made in a much more limited capture volume.

In scenarios of use, it is therefore possible to consider that the ambient magnetic field exhibits a majority contribution due to the natural terrestrial magnetic field, which can be considered to be constant in space and over time, to which are added contributions from the environment, which exhibit the same characteristics.

The invention provides a method for filtering, without user intervention, the disturbances which add to the normal physical field which is substantially constant over time and in space, by using jointly with the signals delivered by the sensor of the physical field, a measurement of the rotation of the mobile device onboard which the physical field sensor is embedded. It is this rotation measurement, which the invention considers to be imperfect, that makes it possible to form a rotational transformation from the frame of the sensor BF (we also denote by EC the frame tied to the sensor assembly which is merged with or equivalent to the frame BF, since they are identical or determined with respect to one another by a known and constant rotation) to the pseudo reference frame QEF. It is obvious that in the case where this measurement of rotation of the mobile device is perfect, the rotational transformation between the frame of the sensor BF and the terrestrial reference frame would be known directly. The invention then still applies, and its aim would then be to separate the disturbances of the signal of the to the physical fields which is constant over time and in space.

FIG. 1 illustrates the general principle of the invention. The temporal measurement EC(t) provided by the measurement sensor or sensors (such as the accelerometers or the magnetometers) of a sensor assembly EC, in the frame of the moving entity BF for "Body Frame", of a vector physical field which is substantially constant over time and in space in a reference frame EF, undergoes a first transformation T1 by a first change-of-frame operator R(t) by rotation between the moving frame BF and a pseudo reference frame QEF. The pseudo reference frame QEF is considered to be related to the reference frame EF by a rotation which is constant or slowly varying over time. The sensor assembly EC is tied fixedly in motion to a moving frame BF, moving in the reference frame EF and in the pseudo reference frame QEF. A filtering FILT is thereafter applied to the measurements thus transformed in the pseudo reference frame QEF, and then a second transformation T2, the inverse of said first transformation, is applied to the measurements filtered by said filtering FILT, from the reference frame QEF to the moving frame BF, with the aid of a second change-of-frame operator $R^{-1}(t)$ by rotation between the pseudo reference frame QEF and the moving frame BF, the inverse of said first operator R(t). These steps make it possible to isolate, in the measurements thus transformed, and according to the choice of the filter (advantageously chosen between a low-pass or a high-pass), the values related to the vector physical field which is substantially constant over time and in space in a reference frame EF, or on the contrary, the disturbances which add thereto. It is an optimal separator of these contributions.

The second operator $R^{-1}(t)$, the inverse of said first operator R(t), when said operators are rotation matrices, are one another's transpose matrices $R(t)^T$. This allows easy calculation by matrix transposition T.

In an advantageous manner, as represented in FIG. 2, it is possible to utilize data provided by a gyrometer G which is included in the sensor assembly to determine the first rotational transformation operator R(t) between the frame BF of the moving entity carrying the sensors, and the frame QEF, for example by time-integration of the measurements provided by the gyrometer G. This calculation can for example be carried out at a greater calculation frequency than the frequency of calculation of the application of the first transformation T1, of the filtering FILT, and of the second transformation T2. It can be performed by a specialized and effective calculation unit so as to carry out the calculation at higher frequency than the other steps of the invention in order to reduce the error due to the size of the time steps.

The present invention is therefore particularly beneficial in the case of a mobile device in the terrestrial frame, therefore also in the pseudo reference frame QEF, for example, onboard which is embedded an attitude measurement unit comprising at least one Gyrometer and a sensor of the physical field which is constant over time and in space in the reference frame EF. Thus, it is possible to calculate, with the aid of the Gyrometer onboard the sensor assembly, the value of the first operator of the transformation T1, and the sensor assembly thus suffices by itself and the value of the operator of the transformation T1 does not depend on a sensor or on an additional assembly. With the Gyrometer, the pseudo reference frame QEF is therefore related to the terrestrial frame EF by a transformation comprising an unknown constant rotation part, and a rotation part drifting slowly over time. This is due to the properties of the gyrometer which delivers rotation speeds, and therefore the rotation of the frame (EC or BF) carrying the gyrometer on the basis of the signals of the gyrometer) with respect to the terrestrial reference frame EF is known only to within a constant, and moreover, as the gyrometer exhibits a non-zero measurement bias, the rotation of the frame carrying the gyrometer calculated on the basis of the signals of the gyrometer then also exhibits a slow drift contribution, dependent on the amplitude of the bias of the measurements.

As a variant, the first operator R(t) can be determined on the basis of measurements provided by another attitude measurement unit, an optical sensor, an electromagnetic sensor, or a mechanical sensor.

In the subsequent description, the use of a gyrometer is described in greater detail, but in a nonlimiting manner.

The invention termed "Spherical Filtering" is based on the following finding: the gyrometer G delivers signals representative of the instantaneous rotation speeds of the mobile device, along the axes of the frame BF tied to the mobile device. The instantaneous speeds delivered by the gyrometer are delivered in the moving frame BF.

On the basis of these gyrometric signals, according to schemes known to the person skilled in the art, it is possible to calculate an orientation or attitude of the mobile device in a pseudo reference frame QEF related to the terrestrial frame EF (regarded as an inertial frame) by a rotation which is constant or slowly drifting over time.

The reference frame EF is assumed here to be Galilean, except if the effects of the rotation of the Earth are not negligible with respect to the performance of the gyrometer. As long as no effect (acceleration), that is a consequence of a rotation, can be measured, a frame of reference can be considered to be inertial. Hence the definition of an inertial frame depends on the precision of the measurements carried out. In the present invention, it is considered that the terrestrial frame (usually defined by a vertical vector, and a horizontal North) is Galilean.

Indeed, just as it is possible to calculate a position datum (therefore a datum according to translation coordinates) of a moving entity on the basis of a translational speed signal of this moving entity, it is possible to calculate an orientation or attitude of a mobile device on the basis of its rotation speeds. The known conventional schemes are termed "integrative". They calculate an integral sum of the small changes in orientation in the course of time. The small changes are calculated directly on the basis of the instantaneous rotation speeds. In a particular mode, the integral calculation method can be implemented at higher rate than the sampling rate of the accelerometric or magnetometric signals, advantageously aboard a circuit which is specialized for this type of calculation. This makes it possible to reduce the errors due to the large sampling time steps.

However, on the basis of a gyrometer, on the one hand, it is normally necessary to know an initial orientation or attitude of the mobile device in the terrestrial frame (or to know this orientation at a given instant), since the gyrometer delivers only rotation speeds and since the schemes for calculating the orientation are integrative—therefore do not afford access to an absolute orientation in the terrestrial frame—, and on the other hand, like any sensor, the gyrometers exhibiting a bias, which is considered moreover to possibly drift slowly over time, hence, the orientation thus calculated likewise exhibits a slow temporal drift with respect to the actual orientation of the mobile device. To illustrate these two effects in a simple case, the orientation of a device which is motionless in the terrestrial frame EF, thus estimated on the basis of rotation speeds, is unknown to within a constant rotation operator and it will drift slowly over time. The gyrometer therefore affords access only to the value of the orientation of the mobile device in a pseudo reference frame QEF. For a perfect gyrometer, the drift of the estimator is zero, whilst the constant rotation operator remains unknown. The frame QEF is then fixedly related to the terrestrial reference frame EF by a constant but unknown rotation operator. In the real case of a sensor with bias, the frame QEF is then related to the terrestrial reference frame EF by a rotation operator which drifts slowly over time.

In conclusion, the signals arising from a gyrometer G therefore make it possible to calculate, at each instant, to within an unknown constant rotation and to within a temporal drift, dependent on the bias of the gyrometer, the orientation of the moving entity in the terrestrial frame. The spherical filtering scheme proposed here takes these properties directly into account. It does not therefore in any way assume that the Gyrometer is perfect, this being a considerable advantage of this invention, since the defects inherent in the gyrometer are taken into account.

The method of "spherical filtering" as presently dubbed, is particularly advantageous in respect of devices onboard which a gyrometer is embedded. It is however possible to utilize in the spherical filtering method any attitude measurement datum for the mobile device or any datum of rotation speeds of the mobile device, instead of that calculated on the basis of the signals of a gyrometer.

We propose here a description of the steps of the spherical filtering in the case of the filtering of a physical field measurement carried out by a sensor suitable for measuring this physical field.

The present invention is particularly beneficial in respect of a sensor assembly EC onboard which an accelerometer A and/or a magnetometer M are/is embedded. The sensors are mechanically fastened to the mobile device. It is assumed that at each instant a datum is available regarding the orientation of the mobile device in the pseudo reference frame QEF, the latter therefore being known to within an unknown constant orientation, and optionally exhibiting a behaviour drifting slowly over time with respect to the reference frame EF. We have seen that it is possible to find this datum regarding the orientation of the mobile device in the pseudo reference frame QEF, for example by virtue of a gyrometer.

With the present invention, the data processed by the method described make it possible, with the accelerometer A, to separate the gravitational contribution from the inherent acceleration contribution. Likewise in respect of the magnetometer, with the present invention, the method described makes it possible to separate the magnetic disturbances from the contributions of the main field. On the basis of the gravitational contribution thus obtained, it is possible to provide the angles of inclination of the device in the terrestrial frame EF. With the two sensors it is then possible to provide the complete orientation of the device in the terrestrial frame EF.

On the basis of the inherent acceleration obtained according to the method, it is possible to estimate parameters related to the trajectory of the device in the terrestrial frame. It is therefore advantageous to be able to separate these two contributions of gravitational acceleration and inherent acceleration. Concerning the magnetic sensor M, this entails reducing the effect of the magnetic disturbances and thus being able to provide the heading of the device with respect to the main field, while avoiding having to follow all the magnetic disturbances.

Here, the accelerometer sensor measures the sum of the gravitational field contributions and the inherent acceleration contribution. It will be considered that the geometry of the mobile device and of the sensors is known and that it is thus possible to express all the signals generated by the sensors in the same frame tied to the mobile device BF or EC. It is considered that the measured values forming the accelerometric signals are corrected of the biases (or offsets) and gains (or sensitivity).

The frame associated with the Earth is denoted EF for "Earth Frame", the pseudo reference frame is denoted QEF for "Quasi Earth Frame". The frame associated with the mobile device, i.e. associated with the sensor, is denoted BF for "Body Frame". The transformation operator which makes it possible to transform vectors from the frame BF to the frame QEF by rotation is denoted R(t). It is possible to use the various formalisms well known to the person skilled in the art to represent and implement this transformation operator (quaternions, rotation matrices, Euler or Cardan angles etc.). This rotation varies in the course of time, according to the motions of the mobile object in the pseudo reference frame QEF. If $v_{QEF}$ designates a vector expressed in the frame QEF and $v_{BF}$ the same vector expressed in the frame BF, we then have the following relation linking the three terms thus defined:

$v_{QEF}=R(t)*v_{BF}$. This transformation is valid for any vector whose coordinates it is desired to express in the frame QEF, on the basis of its expression in the frame BF.

The signal delivered by the accelerometer is modelled:

$A_{BF}=R(t)^{-1}*g_{QEF}$ $ap_{BF}(t)+aw_{BF}(t)$, where:

$A_{BF}(t)$ represents the output (with three components) of the accelerometer A (in the sensor frame BF), $g_{QEF}$ represents the gravitational field contribution in the frame QEF. It is a vector that is conventionally modelled as constant in the terrestrial frame EF, the terrestrial gravity field generally being relatively well approximated by a uniform field at the surface of the Earth and directed towards the centre of the Earth. It is made up of three components. In the conventional case of the choice of a reference frame whose z axis is vertical, $g_{EF}=[0,0,g]$, g being the amplitude of the terrestrial gravity field. It is fairly common to work in units of g, so $g_{EF}=[0,0,1]$ constitutes a good approximation with g=9.81 m/s² at the surface of the Earth. In the frame QEF which drifts slowly with respect to the frame EF, $g_{QEF}$ is no longer constant, but drifts slowly.

$R(t)^{-1}$ represents the rotational transformation operator which makes it possible to switch from the frame QEF to the frame BF. It is naturally variable over time, the mobile device being presumed mobile. It should be noted that, usually, the model of the signal delivered by the accelerometer is presented as a function of $g_{EF}$, gravity vector in the terrestrial frame, and not $g_{QEF}$. The present invention relies on the fact that the operator R between the frames EF and QEF is generally not known. The invention therefore takes this majority case directly into account. In a majority practical case R is determined for example on the basis of the gyrometer G as in FIG. 2, or it is available on the basis of another source as in FIG. 1.

$R(t)^{-1}*g_{QEF}$ therefore represents the acceleration contribution measured by the accelerometer A, in the frame BF of the mobile device, due to gravity. It is also a vector with three components. This contribution is naturally variable over time as a function of the orientations taken by the mobile device in the terrestrial frame. For a motion of pure rotation of the mobile device at a given frequency, a signal contribution is thus observed at this same frequency in the measurement of the accelerometer A, due to the Earth's gravity field.

$ap_{BF}(t)$ represents the inherent acceleration of the moving entity, in the moving frame. In a frequency representation, this signal therefore comprises a contribution with the same frequency distribution as that of the translational displacements undergone by the mobile device. Moreover, if the sensor is not positioned on the instantaneous centre of rotation of the mobile device, an inherent acceleration contribution due to the rotation speed and to the distance to the centre of rotation is created and adds to the contribution due to the translational motions. The signal therefore comprises a contribution with the same frequency distribution as that of the rotational displacements undergone by the mobile device. This was seen previously.

$aw_{bf}(t)$ represents the noise of the sensor in the moving frame BF.

$R(t)$ and its inverse transformation $R(t)^{-1}$ are deduced from one another simply, as they are rotational transformation operators. For example when R is represented by a rotation matrix, $R(t)^{-1}$ is obtained by transposing R i.e. $R(t)^t$. The operation of calculating the inverse is represented in the figures by a transposition function.

As represented in FIG. 1, the spherical filtering consists in applying the rotational transformation operator provided or estimated R(t) to the signal of the accelerometer $A_{BF}(t)$ for example (case of FIG. 3), doing a low-pass filtering of the components thus obtained and applying the estimated inverse rotational transformation operator $R(t)^{-1}=R(t)^t$. According to the notation of FIG. 1, the signals arising from the sensor assembly are denoted EC(t). EC(t) can comprise $A_{BF}(t)$ for the accelerometer and/or $M_{BF}(t)$ (which are denoted, for the sake of simplification, A(t) and M(t) in FIG. 3) for the magnetometer, according to the magnetometer-specific notation which will be introduced below.

FIG. 2 illustrates the method when a gyrometer G is available to estimate R(t). The method of the invention applies indeed perfectly for an estimator of the rotation operator which is known to within a constant rotation matrix and exhibits a slow drift over time, this being particularly advantageous for gyrometer-based devices, which are known for exhibiting slow drifts and which make it possible to calculate an estimator to within an unknown constant rotation matrix. The invention does not require that the rotational transformation operator be a perfect estimator of the change of frame between the moving entity and a frame tied to the Earth.

FIG. 3 schematically illustrates a method and a system of FIG. 2 according to an aspect of the invention, in which the sensor assembly comprises an accelerometer A and/or a magnetometer M. EC represents the sensor assembly and generates the measurements arising from sensors such as the accelerometer and/or the magnetometer. For the sake of simplification, A(t) denotes the measurements arising from the accelerometer and M(t) the measurements arising from the magnetometer, and the results of the filtering method of the invention are denoted by $A^f(t)$ and $M^f(t)$.

The filtering FILT can be a high-pass or a low-pass according to the measurement contribution that it is sought to isolate (that is to say either the physical field constant over time and in space in the frame RF or the inherent acceleration/the magnetic disturbance). For example also, the filtering FILT applied in the frame QEF after transformation may be adaptive, for example by using a linear filtering with variable gain or a linear filtering of Kalman type. FIGS. 1, 2, 3 present advantageous practical implementations of the filtering proposed by the invention. It is understood better why these steps are advantageous and how they operate in the light of FIGS. 4 and 5.

Figure 5A:
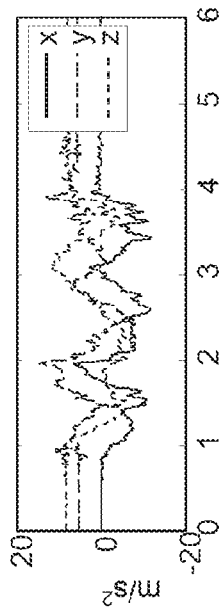
Figure 5B:
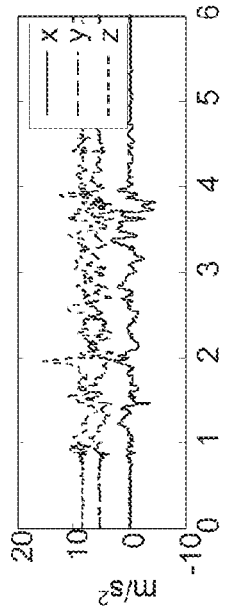
Figure 5C:
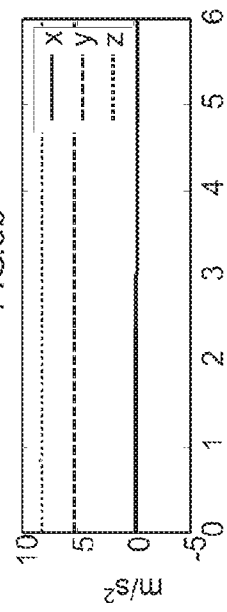
Figure 5D:
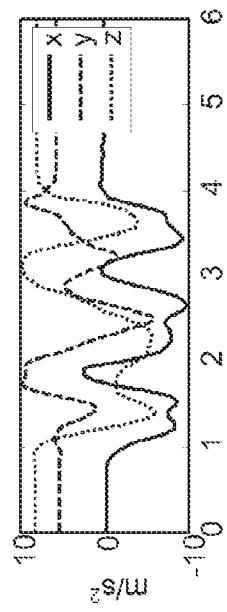
Figure 5:
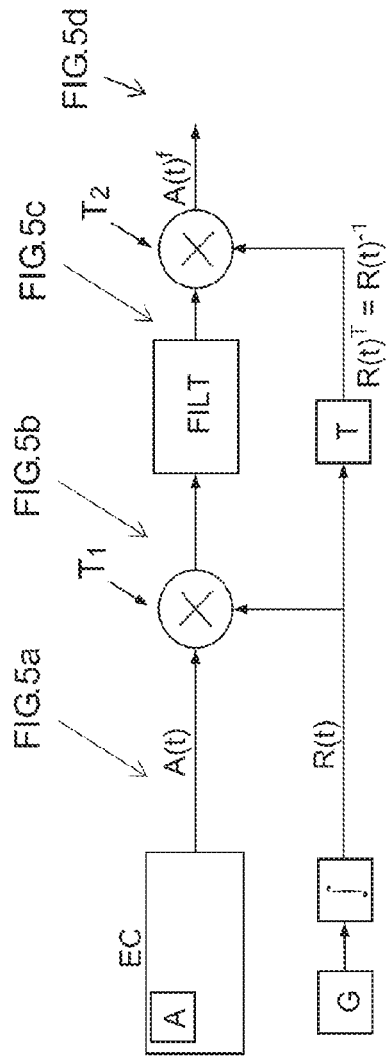

FIGS. 4, 4a, 4b, 4c and 4d and FIGS. 5, 5a, 5b, 5c and 5d represent, respectively in the frequency space for FIGS. 4, 4a, 4b, 4c and 4d and in the time space for FIGS. 5, 5a, 5b, 5c and 5d, the evolution of the behaviour of the signals as the steps of the method proceed. To fix ideas on a concrete example, FIG. 5 presents the behaviour of the signals in various steps of the method of the invention for a time slice of an acceleration signal A(t). The behaviour of the signals is represented in four different steps of the method of the invention according to the notation of FIGS. 4 and 5 for the example of FIG. 3, before, in the course of two intermediate steps and after the application of the spherical filtering method.

Represented schematically, in a frequency manner, in FIG. 4a is the signal measured by the accelerometer $A_{BF}(t)$ (or denoted A(t) for the sake of simplification in the figures) or of the magnetometer $M_{BF}(t)$ (or denoted M(t) for the sake of simplification in the figures), in the frame BF of the mobile device. FIG. 5a presents a temporal realization of A(t) (or else $A_{BF}(t)$) in the same step. The signal comprises a contribution due to gravitation termed the "useful signal", in the legend of FIGS. 4, 4a, 4b, 4c and 4d, which is spread according to the spectral behaviour of the rotational motions impressed on the mobile device, i.e. on the sensor assembly EC, i.e. here over a band, given by way of example of 30 Hz. This gravitation signal constitutes, in this example, the useful part of the measurement arising from the sensor. It provides the components of the terrestrial gravity field along the measurement axes of the sensor in the frame of the sensor. It is this information termed "useful" (at least in respect of an application for example for estimating the orientation of the moving entity in motion), to which the "noise", notably the acceleration signal specific to the moving entity, will be added. The gravitational contribution serves to calculate the orientation of the sensor with respect to the terrestrial gravity vector, that is known oriented vertically with respect to the terrestrial frame. Likewise for the magnetometer, the useful signal is due to the terrestrial magnetic field. The signal measured by the sensor comprises, moreover, a second contribution denoted "acceleration" according to the legend of FIGS. 4, 4a, 4b, 4c and 4d for the accelerometric sensor, and "disturbance" for the magnetometric sensor according to the legend of FIGS. 4, 4a, 4b, 4c and 4d, and spread over a band dependent on the translational and rotational motions. It should be noted that, apart from exceptional cases of situations in which the inherent translation acceleration would be constant over time and direction and where the inherent acceleration due to the rotational motions would be constant over time and in direction, this inherent acceleration contribution does not exhibit any continuous contribution. It is a reasonable assumption in so far as in many cases, the mobile device is displaced in a finite measurement volume, such as for example for a game peripheral, a mobile telephone, a sports accessory, etc. Finally, the sensor's noise contribution is represented, modelled here as white noise and denoted "white noise" and which is spread, according to the representation given here, over the entire frequency band of acquisition of the sensor. The noise could be coloured and the invention would apply in the same manner. The choice of representation of white noise simplifies the representations, but the method also applies for coloured noise. These three contributions shown diagrammatically in FIGS. 4, 4a, 4b, 4c and 4d and represented in the course of the steps of the method add together to form the sensor measurement. FIG. 5a represents a temporal realization of measurement of the sensor along the three measurement axes where the set of these three contributions (gravitation, sensor noise and inherent acceleration) add together. In the acceleration time slice of FIG. 5, the sensor assembly is subjected here to translational motions and rotations in the frame of the Earth. The sensor assembly is firstly set down, motionless, and then subjected to these motions, comprising inherent acceleration, and then set down again.

There is conventionally proposed, in the prior art, a scheme for low-pass filtering of the signal arising from the accelerometer, so as to separate the gravitational contribution from the inherent acceleration contribution. This method is however doomed to failure, in so far as, though it is reasonable to consider that the inherent acceleration does not comprise any zero frequency contribution, it is false to consider that the contribution due to the gravitation field ("useful signal" in FIGS. 4, 4a, 4b, 4c and 4d) is concentrated towards the low frequencies. Indeed, it was shown previously that the contribution of the gravity field to the sensor signal exhibits a frequency behaviour directly related to the spectrum of the rotational motions imposed on the mobile device, i.e. on the sensor assembly EC. It is thus readily understood that for games applications or sports applications, or for motions of a mobile telephone, the rotational motions impose a frequency spectrum which is certainly much wider than concentrated solely in the low frequencies. Thus, a low-pass filtering operation, for example with a cutoff frequency at 1 Hz applied directly to the signal of the sensor cuts a part of the gravitation signal and thus does not achieve good separation of the contributions from gravity and from the inherent acceleration. Otherwise, it would be possible to choose a higher cutoff frequency, which comprises the whole of the frequency spectrum of the motion, but then, it is understood that a large contribution from inherent acceleration remains in the signal thus filtered. Here again, a simple low-pass filtering operation is not effective for separating the contribution from gravity from the contribution from the inherent acceleration since these frequency contributions are not separable in terms of frequencies when the measurements are performed in the frame of the sensor.

The spherical filtering method proposed in the present invention thus comprises a first transformation T1 (FIGS. 4 and 5), by a rotational transformation operator from the moving frame BF to the pseudo reference frame QEF, of the signals arising from the accelerometer, A(t) and/or from the magnetometer, M(t). The frequency behaviour of the signals thus transformed is represented in FIG. 4b. The temporal behaviour of the temporal realization of the accelerometer is represented in FIG. 5b. In so far as the operator R(t) of rotational transformation T1 defines the switch from the frame BF to the frame QEF, it is reasonably considered that it drifts slowly over time, it can be readily shown that the contribution of the contribution due to gravity (or due to the terrestrial magnetic field) then behaves as a signal exhibiting a frequency contribution concentrated around the zero frequency and spread in terms of frequencies according to the rate of drift of R(t). FIG. 4b shows the effect, in a frequency representation, of the operator T1 on the useful signal. The power is concentrated around 0, with spreading that is all the more significant the larger the drift of the operator T1. The fact that the operator R(t) is known only to within a constant rotation with respect to the terrestrial reference frame does not modify the frequency behaviour of the gravity field contribution. For an estimator of the rotational transformation operator R(t) arising from a perfect gyrometer, the frequency contribution of the contribution of the gravitational field (or of the Earth's magnetic field) would then merge identically at 0. For an estimator drifting slowly over time, this contribution is spread over a small span of frequencies, identical to that of the drift of the rotational transformation operator R(t). The rotational transformation operation R therefore concentrates towards the low frequencies the contribution of the gravity field since the frame QEF drifts slowly with respect to the frame EF, and since in the latter the gravity contribution is perfectly constant. The other contributions (inherent acceleration or magnetic disturbances and endogenous noise) do not exhibit the same behaviour and remain spread over the whole of the frequency spectrum. The effect of the transformation T1 on the three spectra of the "useful" signal, of the "acceleration and disturbance" signal and of the white noise of the sensor is represented in FIG. 4b. FIG. 5b represents a temporal realization of the accelerometer signal, after transformation by T1. A continuous or slightly drifting contribution (for each measurement axis) is noted, representative of the value of the gravity field and to which is added the inherent acceleration which appears in the form of fast variations around the continuous contribution (for each measurement axis). Visually, gravity is therefore separated from the other contributions of the signal.

In FIG. 4c, the spectrum shows diagrammatically the behaviour of the various contributions of the signal of the accelerometer A (and/or of the magnetometer) after a low-pass filtering operation, here schematically parametrized with a cutoff frequency of 1 Hz, which is chosen for example but notably as a function of the drift behaviour of the rotational transformation estimator. This filter FILT can have parameters determined in advance, but it should be noted that it is also naturally intended, in this instance, to be an adaptive filter, whose filtering parameters are essentially the cutoff frequency. It will thus be possible to constantly adapt the compromise between speed of reaction and quality by producing an adaptive filter. In the temporal representation of FIG. 5c, the effect of the low-pass filtering is apparent: the high frequencies due essentially to the inherent accelerations and to the endogenous noise of the sensor are strongly attenuated. Only the low-frequency contributions remain, which are due essentially to the gravity signal.

For example, the value of the cutoff frequency (taken here equal to 1 Hz) depends on the quality of the bias of the gyrometer G, if the device comprises a gyrometer used to estimate the rotational transformation operator R(t). The effect of the low-pass filter is to preserve the entirety of the contribution of the acceleration signal due to gravity (and/or of the terrestrial magnetic field), and to considerably reduce (here therefore by a factor of 1 to 30) the contribution of the white noise and that of the inherent acceleration (and/or of the magnetic disturbances). This key step therefore considerably reduces the contributions which add to the terrestrial gravity field (and/or to the terrestrial magnetic field). The optimal estimation is then available according to our method of spherical filtering of the gravity contribution, in the pseudo terrestrial frame QEF.

To obtain the signals thus filtered after these two key steps again in the moving frame BF, it is then possible to undertake a second transformation T2 by inverse rotation $R(t)^{-1}$ of the first transformation T1. FIG. 4d represents schematically, in the frequency domain, the various contributions on exit from the spherical filtering, that is to say after the application of the rotation T2. It is noted that the majority contribution is that of the contribution from gravitational acceleration (and/or from the terrestrial magnetic field), which has not been distorted or attenuated by the steps of the method, whilst the other contributions have been considerably reduced by a factor depending on the cutoff frequency of the filter (here low-pass) used in the spherical filtering method, this cutoff frequency itself being dependent on the drift quality of the estimator of the rotational transformation operator from the moving frame BF to the pseudo reference frame QEF. FIG. 5d represents a time slice in the same output step of the filter of the invention. The essentially remaining contribution is that of gravity, the other contributions from inherent acceleration and from noise endogenous to the sensor are considerably reduced.

The reader will easily note on the basis of FIG. 4b, as was mentioned previously, that it is very simple to replace the low-pass filter described hereinabove with a high-pass filter which would completely eliminate the gravitation signal (useful signal) or the terrestrial magnetic field. After this filtering, the inherent acceleration is then available in the terrestrial pseudo frame. An inverse transformation operation then enables the inherent acceleration to be made available in the moving frame, on exit from the method.

It is then possible to note between FIG. 4a and FIG. 4d in the frequency space and between FIG. 5a and FIG. 5d in the time space, the contribution of the invention in terms of increasing the signal-to-noise ratio of the useful signal (here the gravity field or the magnetic field) with respect to the inherent accelerations (and/or magnetic disturbances), and to the noise present in the band.

The first and second transformations T1 and T2 simply consist in transforming the measurements provided by the accelerometer A and the magnetometer M into an arbitrary frame termed the pseudo reference frame QEF, for example calculated on the basis of the measurements of the gyrometer G. This frame has an unknown constant and slowly drifting orientation with respect to the reference frame EF of the Earth, which the proposed invention circumvents, this representing a significant advantage. This frame exhibits the property of drifting slowly with respect to the frame of the Earth because of the drift of the bias of the gyrometer G. Thus, the data transformed into the frame QEF (which drifts slowly with respect to a reference frame EF) exhibit the following frequency characteristics: for the magnetometer M just as for the accelerometer A, the correct terrestrial field contribution (gravitational respectively magnetic) is pushed back to the bottom of the frequency spectrum. For a zero bias drift, which is hypothetical but which makes it possible to understand the invention in a limit case, it would be reduced to a continuous contribution. The inherent acceleration contribution is, for its part, always present over the whole spectrum. Without other more precise assumptions, it is considered that the contributions from magnetic noise that are due to spatial anomalies of the field or noise from poor calibration are present over the whole spectrum. The proposed transformation therefore exhibits the correct property of separating frequentially, for the measurements of the accelerometer, the gravity field and the inherent acceleration or the endogenous noise of the sensor. In this frame QEF, drifting slowly with respect to the frame EF, a low-pass filtering on the transformed signals of the accelerometer A and the transformed signals of the magnetometer M then makes it possible to preserve the low band in which the terrestrial gravitational field and terrestrial magnetic field contribution lies, and thus to best remove the noise contributions. The operations are simple and can be carried out under heavy calculation footprint constraints (memory and calculation).

For the sake of completeness, the behaviour of the measurements arising from a magnetometer is now described. The terrestrial natural field or Gauss field or main field comprises all the effects of the magnetic field sources of deep origin.

The field of anomalies of the terrestrial natural field comprises all the field sources that are not included in the Gauss field to form the ambient field by being added to the terrestrial natural field, therefore in particular all the contributions from the sources close to the surface of the Earth. It encompasses all the natural effects (magnetization of rocks, magnetic effects of geological events) and non-natural effects (Cars, Buildings, etc.).

The ambient field is the sum of the terrestrial natural field and of the field of anomalies (or field of disturbances). It is this that can be observed. The main field is, for a given scenario, and therefore a given spatial and temporal scale, the contribution of the ambient field which is essentially constant in space and over time.

The disturbance field is the contribution which adds to the main field to give the ambient field. The disturbance field is generally small compared to the main field.

We denote by $h_{QEF}(t)$ the main physical field at the position of the magnetic sensor of the mobile device or, stated otherwise, of the sensor assembly EC, in the pseudo reference frame QEF. By definition, the main field is substantially invariant in space and over time for the scales of the scenario considered in the frame EF. The frame QEF drifts slowly in the frame EF. The consequence is that $h_{QEF}$ exhibits a majority constant contribution which drifts slowly over time. $H_{BF}(t)$ is its transform in the moving frame BF tied to the sensor. We then have the following relation linking the two vectors thus defined: $h_{QEF}(t) = R(t) * h_{BF}$.

The signal delivered by the magnetometer M onboard the mobile device, which measures the ambient magnetic field, is denoted $M_{BF}(t)$. A general model relating $M_{BF}(t)$ to $h_{QEF}(t)$ can be written: $M_{BF}(t) = R(t)^{-1} * h_{QEF} mp_{BF}(t) mw_{BF}(t)$.

It is assumed that the sensor delivers debiased, calibrated measurements along orthonormal axes of the moving frame.

As indicated previously, $h_{QEF}(t)$ designates the main field, at the position of the magnetometer, away from magnetic disturbance field, and expressed in the frame QEF. $H_{QEF}(t)$ is therefore a vector quantity which is approximately constant over time, and the equation can be simplified by writing simply $h_{QEF}$.

$mp_{BF}(t)$ represents the disturbances due to the field of magnetic disturbances measured along the axes of the magnetometer.

Finally, $mw_{BF}(t)$ represents the endogenous noise of the magnetometer and of the system onboard which the magnetometer is embedded.

The invention provides an estimator of the magnetic field $h_{QEF}$ or of its disturbances $mp_{BF}$ on the basis of the signals $M_{BF}(t)$ arising from the magnetometer M, and with the aid of a knowledge of the rotational transformation operator between the frame QEF and the moving frame BF tied to the magnetometer M. Just as for the schemes set forth in the prior art, the correct constancy properties of the main field are therefore fully utilized by the invention.

In FIGS. 1, 2, 3, 4, 4a, 4b, 4c, 4d, 5, 5a, 5b, 5c and 5d are illustrated the key step of the method of the present invention. It consists in transforming the vector signal $M_{BF}(t)$ under the change-of-frame operator R(t) by rotation between the moving frame BF and the pseudo reference frame QEF so as to obtain a vector signal $M_{QEF}(t)$ expressed in the pseudo reference frame QEF.

The thus transformed contribution of the main field $h_{QEF}$ is then a slowly drifting constant since the value of the main field is considered to be constant in the reference frame EF and since the frame QEF drifts slowly with respect to the frame EF. The disturbance contribution is transformed by the same operation and then takes the form of a time-varying signal $mp_{QEF}(t)=R(t)*mp_{BF}(t)$. This contribution varies if one moves with respect to the disturbance source. If the relative position of the sensor remains the same with respect to the disturbance source, the contribution remains constant. It is thus identified in this step, from the sensor signals transformed into the pseudo reference frame QEF, that the main-field contribution is predominantly a constant, which may spread into the low part of the spectrum as a function of the drift of the frame QEF with respect to the frame EF, whilst the disturbance contributions occupy a wider part of the spectrum. The invention and its variants are based on this finding and proposes a means of estimating either the contribution of the main field, by way of a low-pass filter, or the disturbance contribution through a high-pass filter.

The invention proposed according to the method described hereinabove requires the availability of a representation of the rotation of the mobile object with respect to the pseudo reference frame QEF, previously denoted in the form of an operator R(t). To do this, it is possible to utilize the rotation estimated by an attitude measurement unit employing all or part of the combinations of accelerometers, gyrometers and magnetometer. It is moreover possible to utilize a representation of the rotation of the mobile object with respect to the pseudo reference frame QEF, estimated on the basis of another sensor (optical, radio, electromagnetic, mechanical). In the most conventional cases constrained to use only an IMU to the exclusion of other external information, the gyrometer is used to form R(t) and apply the method to the accelerometric and/or magnetometric signals with R(t). The invention then makes it possible either to isolate the contribution of gravity or that of the main magnetic field. The person skilled in the art will know how to utilize these signals thus isolated to calculate an orientation of the inertial measurement unit in the frame of the Earth.

It is also very important to note that the rotation between moving frame BF and the pseudo reference frame QEF can take any convention of frame tied to the Earth as pseudo reference frame QEF. The frame QEF must, however, drift only "slowly" with respect to the frame EF. For any frame tied fixedly (or slowly drifting) with respect to the Earth, even of unknown orientation with respect to the conventionally used terrestrial axes ("North, East, Down"), the proposed invention applies. Indeed, the properties described hereinabove of the transformed signals of the main field and of the variation of the contribution due to the bias remain entirely valid, even if the pseudo reference frame QEF chosen is not known with respect to the conventional terrestrial frame ("North, East, Down") to within a rotation. It is therefore not necessary sensu stricto to use for R a rotation operator (for example, a rotation matrix) with respect to an orientation frame known a priori with respect to the terrestrial frame. This important property makes it possible to broaden the field of possibilities for providing the operator R (t). Thus any sensor which provides the rotation speed of the mobile object in the terrestrial frame or in the pseudo reference frame QEF is sufficient to apply the present invention. This is why it applies particularly well in respect of an operator R calculated on the basis of the signals of an onboard gyrometer.

Consequently, in an advantageous mode of the invention, it is possible to utilize the datum of a gyrometer G in order to estimate a rotational transformation operator R(t) from the moving frame BF to the pseudo reference frame QEF (for example in matrix form). Even if it is known that the rotational transformation operator will thus provide only an approximation of the orientation of the moving entity with respect to the reference frame (fixed with respect to the Earth), the invention applies since it is particularly suited to this case. This type of gyrometric sensor delivers the rotation speeds of the mobile object in the frame of the mobile object BF. It is known to the person skilled in the art that, on the basis of these data, it is possible to estimate the rotation R(t) of the moving frame with respect to a frame QEF related to the terrestrial frame by an unknown rotation operator but which is drifting only slowly with respect to the terrestrial frame, with recourse to a time-integrative function of the data of the gyrometer G. Just as a translation value can be estimated on the basis of a linear speed datum to within a constant, it is possible and known to the person skilled in the art to estimate a rotation on the basis of rotation speed data.

Thus, the invention makes it possible to exploit in an optimal manner the sensors conventionally present in attitude measurement units, as is the gyrometer. The advantage is that the method of the invention exploits the information afforded by this sensor, by considering directly in the method all its advantages and also its defects. In the previous presentations of the invention, it is therefore possible to replace the rotational transformation operator R(t) between the moving frame BF and the pseudo reference frame QEF by a function based on the gyrometer.

Figure 6A:
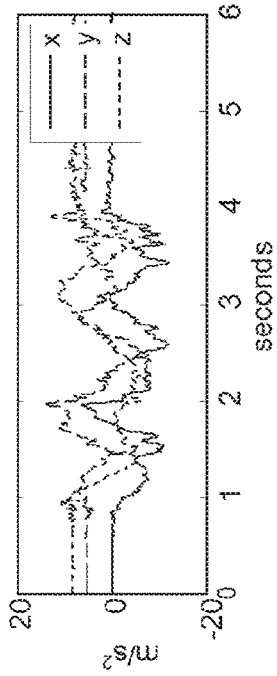
Figure 6B:
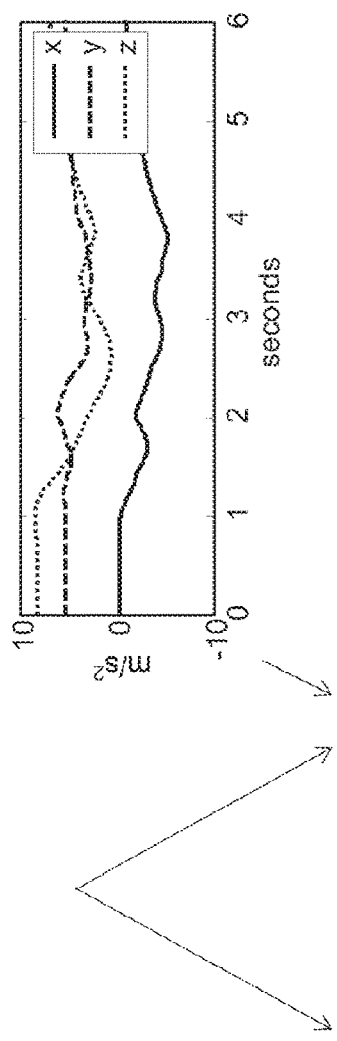
Figure 6C:
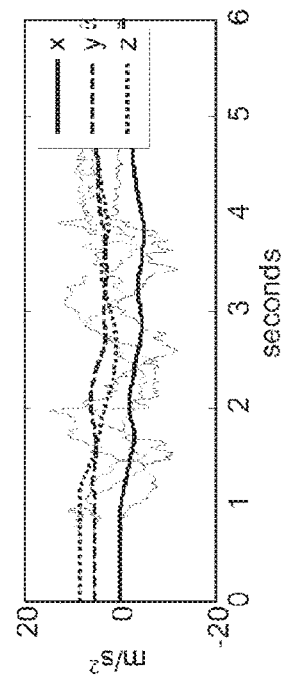
Figure 6D:
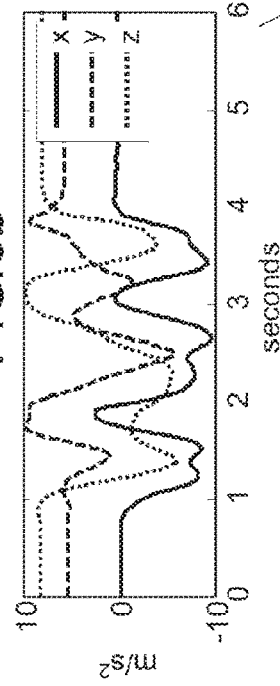
Figure 6E:
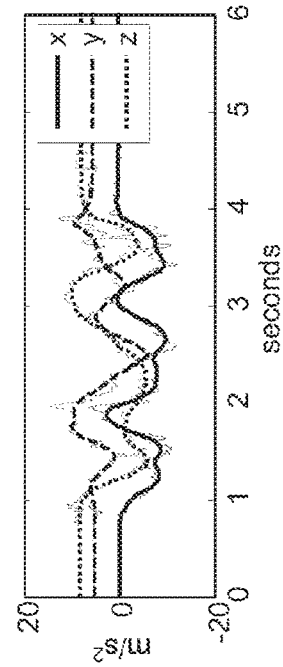
Figure 7:
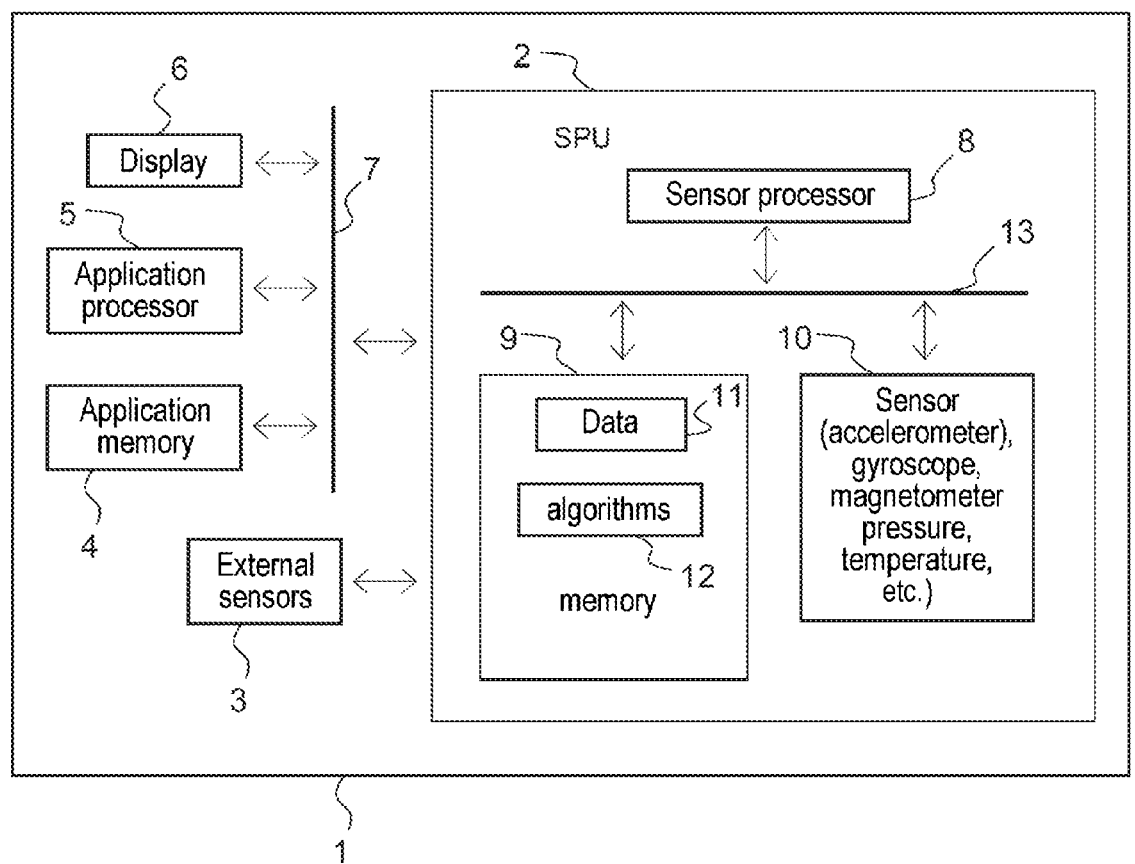

FIGS. 6, 6*a*, 6*b* and 6*d* demonstrate the results of the invention as compared with the results of a direct filtering in the frame of the sensor, as is sometimes present in the prior art techniques illustrated by FIGS. 6', 6*a*, 6*c*, 6*e*. FIG. 6 represents the method of the invention and FIG. 6' represents the method of the prior art. The signals of FIG. 6*a* illustrate an example of a time slice of signals measured and represented in the time space arising from an accelerometer with three axes for the same experimental realization as for the scenario of FIG. 5. FIG. 6*a* presents the signals on entry to the method of the invention. In FIGS. 6*c* and 6*e* are illustrated the signals filtered according to the known art by simple application of a low-pass filter (FIG. 6*c*), and the superposition of the raw and filtered signals according to the known art (in FIG. 6*e*). In FIGS. 6*b* and 6*d* are illustrated the filtered signals (FIG. 6*b*) according to an aspect of the invention using a gyrometer for the determination of the operator T1 and T2, and the superposition of the raw and filtered signals (FIG. 6*d*) according to this aspect of the invention. It is noted that, through its low-pass filtering operation, the method of the prior art considerably deforms the signals of the gravity field whilst it correctly filters the inherent accelerations, whilst they are correctly extracted by the method of the invention. The other adjustments of a high-pass or low-pass filter which are applied to the measurements in the moving frame are also doomed to failure with respect to the advantages afforded by the invention.

The gyrometers, in their low-cost version, exhibit drifts of bias which may be non-negligible, above all in so far as the calculations carried out to obtain a rotation matrix are of the integral scheme type, which tend to amplify the bias effects. Indeed, it is commonplace to observe drifts of several hundred degrees per hour. The scheme proposed here remains very robust to these problems of long-term drift in the measurement. It suffices to adapt the cutoff frequency of the filter according to the class of bias of the sensor. The more significant the bias, the more the physical fields which are constant in the frame of the Earth will tend to drift rapidly in the frame QEF, and the more necessary it will be to increase the cutoff frequency so as not to impair the physical field. The invention is, however, still advantageous, up to the limit where the gyrometer being insufficiently efficacious no longer delivers any relevant information regarding QEF.

The invention has been particularly described in respect of the cases of an accelerometer and the cases of a magnetometer. It is actually particularly relevant in respect of devices onboard which one or the other of these sensors is embedded.

Devices furthermore comprising a gyrometer are particularly suited to the invention. The gyrometer makes it possible to calculate an estimation of the matrix for rotating between the moving frame BF and the pseudo reference frame QEF, thereby making it possible to apply the invention.

Devices comprising a gyrometer, as well as an accelerometer and/or a magnetometer and whose aim is to provide an orientation of the moving entity with respect to the terrestrial frame, can advantageously apply the invention. In this advantageous mode, the results of the filterings of the measurement of the accelerometers and of the magnetometers initially transformed into the frame QEF are transformed from the pseudo reference frame QEF to the moving frame BF and furthermore an additional step makes it possible to calculate the orientation of the moving entity in the reference frame, for example by using a scheme derived from TRIAD or from QUEST. The person skilled in the art knowing these schemes will appreciate the advantageous effect of the invention which makes it possible to reduce the undesired contributions that add to the physical fields, before applying schemes derived from TRIAD (TRI-axial Attitude Deformation) or QUEST (Quaternion ESTimator).

FIG. 7 schematically represents a system 1 according to the invention, such as a mobile telephone.

The details relating to an embodiment of the portable system 1 comprising the characteristics of this disclosure are depicted as high-level schematic blocks in FIG. 7.

Of course, the system 1 can be implemented as a graspable device which can be moved around in space by a user and whose motion and/or orientation in space can consequently be detected.

For example, such a portable device can be a mobile telephone (for example, cellular telephone, a telephone operating on a local network, or any other telephone handset), a wired telephone, a personal digital assistant (PDA), a video games console, a video games control, a navigation system, a physical activity tracker device (such as a bracelet or clip), a sensor worn on the foot, or the leg, a smart watch, another portable device, a mobile Internet device (MID), a personal navigation device (PND), a digital camera, a digital video camera, binoculars, a teleobjective, a portable music device, a video or multimedia player, a remote control, another pocket device, or a combination of one or more of these devices.

In certain embodiments, the system 1 can be an autonomous system or can operate in conjunction with another portable device or a non-portable device such as a desktop computer, a server, etc., which can communicate with the system 1, for example, by way of network connections. The system can be capable of communicating via a wired connection by using any type of wired communication protocol (such as serial transmissions, parallel transmissions, packet switching data communications etc.), via a wireless connection (such as electromagnetic radiation, infrared radiation or some other wireless technology), or a combination of one or more cabled connections and one or more wireless connections.

As represented, the system 1 comprises a sensor processing unit (SPU) 2, one or more external sensors such as the external sensor 3, an application memory 4, an application processor 5, and a display screen 6. The term external refers to sensors 3 that are external to the sensor processing unit 2, and the external sensor can be included in the system 1 or some other device. The application processor 5 can be configured to perform the various calculations and the operations necessary for the general function of the system 1, and can be coupled to the sensor processing unit 2 SPU by a bus 7, which can be any bus or appropriate interface, for example an Express peripheral component interconnection (PCIe) bus, a universal serial bus (USB), a universal asynchronous transmitter/receiver serial bus (UART), an adapted advanced microcontroller bus architecture (AMBA) interface, an integrated-circuit bus (I2C), a serial digital input/output digital bus (SDIO), or any other equivalent. My application memory 4 can include programs, drivers, or other data that use information provided by the sensor processing unit 2.

In the embodiment, the sensor processing unit 2 comprises a sensor processor 8, a memory 9, and a sensor assembly 10. The memory 9 comprises data 10 and algorithms 11 for performing operations such as described in the steps of the invention. The sensor processor can comprise a specialized unit for carrying out specific operations such as the fast-rate gyrometric integration operation. The other steps of the invention can then either be processed in another, more generic, calculation unit of the sensor processor, or aboard the application processor.

The sensor assembly 10 can comprise an accelerometer, and/or a gyroscope, and/or a magnetometer, and/or a pressure sensor, and/or a temperature sensor etc. Such as used here, the internal sensor assembly 10 can use MEMS techniques for the integration of the sensor processing unit 2.

The components of the sensor processing unit 2, such as the sensor processor 8 and the various sensors 10, can be integrated into a single chip or on a set of chips.

The memory 9 and the sensor assembly 10 can be coupled to the sensor processor 8 by a bus 13, which can be any bus or appropriate interface.

Likewise, an external sensor 3 such as represented is a sensor embedded aboard the peripheral 1 which is not integrated into the sensor processing unit 2. An accelerometer and/or a gyroscope and/or any other sensor used in the techniques of the present invention can be implemented as internal or external sensor.

Of course, the application processor 5 and/or the sensor processor 8 can be one or more microprocessors, central processing units (CPUs), or other processors which execute software programs for the system 1 or for other applications relating to the functionality of the system 1. For example, various software application programs such as menu navigation software, games software, camera control software, navigation software, and telephone software, or a large variety of other software interfaces and functional interfaces may be involved.

In certain embodiments, multiple different applications can be provided on one and the same system 1, and in some of these embodiments, several applications can operate simultaneously on the system 1. Several layers of software can be provided on a computer readable medium, such as electronic memory or another storage medium such as a hard disc, an optical disc, a flash reader, etc., for use with the application processor 5 and the sensor processor 8.

For example, an operating system layer can be envisaged for the system 1 in order to control and manage the system resources in real time, to activate the functions of the application software and of other layers and to interface application programs with other software and functions of the system 1.

In certain embodiments, one or more layers of the motion algorithm can provide motion algorithms for the lower-level processing of the sensors' raw data provided by internal or external sensors. Furthermore, a sensor device driver layer can provide a software interface to the hardware sensors of the system 1. Some or all these layers may be envisaged in the application memory 4 for access by the application processor 5 to the memory 9 for access by the sensor processor 8, or in any other suitable architecture.

The steps of the above-described method can be carried out by one or more programmable processors executing a computerized program to carry out the functions of the invention by acting on input data and by generating output data.

A computerized program can be written in any programming language, such as compiled or interpreted languages, and the computerized program can be deployed in any form, including in the guise of autonomous program or as a subprogram or function, or any other form appropriate for use in a computerized environment.

A computer program can be deployed to be executed on a computer or on several computers on a single site or on several distributed sites linked together by a communication network.

The invention claimed is:

1. A method for reducing disturbances in signals acquired from a sensor assembly (EC) comprising at least one sensor for measuring a physical vector field which is substantially constant over time and in space in a reference frame, said sensor assembly being tied in motion to a moving frame, said moving frame moving in the reference frame, the method comprising the steps of: applying a first transformation to measurements of the sensor of the sensor assembly, in which said measurements are provided in the moving frame, to a pseudo reference frame, wherein the pseudo reference frame is derived by time-integration of gyroscope measurements without absolute orientation information, with the aid of a first change-of-frame operator (R(t)) by rotation between the moving frame and the pseudo reference frame; applying a filter to the measurements thus transformed in the pseudo reference frame to reduce disturbances in the measurements of the sensor; applying a second transformation to the measurements filtered by said filter with the aid of a second change-of-frame operator ($R^{-1}(t)$) by rotation between the pseudo reference frame and the moving frame, the second change-of-frame operator being the inverse of said first operator (R(t)); and outputting the filtered measurements after applying the second transformation.

2. The method according to claim 1, in which said second operator ($R^{-1}(t)$), the inverse of said first operator (R(t)), when said operators are rotation matrices, are one another's transpose matrices ($R(t)^T$).

3. The method according to claim 1, in which said first operator (R(t)) is determined by integration over time of the measurements provided by said gyrometer, executed at a greater calculation frequency than the frequency of calculation of the application of the first transformation, of the filtering, and of the second transformation.

4. The method according to claim 1, in which said first operator (R(t)) is determined on the basis of measurements provided by an attitude measurement unit, an optical sensor, an electromagnetic sensor, or a mechanical sensor.

5. The method according to claim 1, in which said applied filtering is adaptive.

6. The method according to claim 5, in which one of a speed of filtering, a quality of filtering, and a frequency of filtering is adapted.

7. The method according to claim 1, in which said applied filtering is one of a linear filter with variable gain, a Kalman filter, and a band-pass filter.

8. The method according to claim 1, in which said sensor is an accelerometer, and said measurements are used to determine at least one of a gravity field vector and a disturbance to the gravity field vector.

9. The method according to claim 8, in which the determining the disturbance to the gravity field vector comprises determining an inherent acceleration of the sensor assembly.

10. The method according to claim 1, in which said sensor is a magnetometer, and said measurements are used to determine at least one of a magnetic field vector, and a disturbance to the magnetic field vector.

11. The method according to claim 1, in which said sensor assembly comprises at least one of an accelerometer and a magnetometer.

12. The method according to claim 1, in which said steps are carried out simultaneously on signals of sensors of the sensor assembly, arising from at least two sensors measuring two distinct and non-collinear physical fields in the reference frame.

13. The method according to claim 1, further comprising a step of determining an orientation of said sensor assembly in the reference frame on the basis of said measurements obtained after their transformation by the first transformation, the filtering, and the second transformation.

14. The method according to claim 1, further comprising an additional step of determining an orientation of said pseudo reference frame with respect to the reference frame, on the basis of said measurements obtained after their transformation by the first transformation and the filtering, before applying the second transformation to the orientation thus determined by the additional step, so as ultimately to obtain the orientation of said sensor assembly in the reference frame.

15. A portable device for reducing disturbances in signals arising from a sensor assembly comprising at least one sensor for measuring a physical vector field which is substantially constant over time and in space in a reference frame, said sensor assembly being tied in motion to a moving frame, said moving frame moving in the reference frame, further comprising a processor operative to: apply a first transformation to the measurements of the sensor of the sensor assembly in which the measurements are provided in the moving frame to a pseudo reference frame, wherein the pseudo reference frame is derived by time-integration of gyroscope measurements without absolute orientation information, with the aid of a first change-of-frame operator (R(t)) by rotation between the moving frame and the pseudo reference frame; apply a filter to the measurements thus transformed in the pseudo reference frame to reduce disturbances in the measurements of the sensor; apply a second transformation to the measurements filtered by said filter with the aid of a second change-of-frame operator ($R^{-1}(t)$) by rotation between the pseudo reference frame and the moving frame, the second change-of-frame operator being the inverse of said first operator; and output the filtered measurements after applying the second transformation.

16. A sensor processing unit for reducing disturbances in signals arising from a sensor assembly comprising at least one sensor for measuring a physical vector field which is substantially constant over time and in space in a reference frame, said sensor assembly being tied in motion to a moving frame, said moving frame moving in the reference frame, the sensor processing unit comprising a processor operative to: apply a first transformation to the measurements of the sensor of the sensor assembly in which the measurements are provided in the moving frame to a pseudo reference frame, wherein the pseudo reference frame is derived by time-integration of gyroscope measurements without absolute orientation information, with the aid of a first change-of-frame operator (R(t)) by rotation between the moving frame and the pseudo reference frame; apply a filter to the measurements thus transformed in the pseudo reference frame to reduce disturbances in the measurements of the sensor; apply a second transformation to the measurements filtered by said filter with the aid of a second change-of-frame operator ($R^{-1}(t)$) by rotation between the pseudo reference frame and the moving frame, the second change-of-frame operator being the inverse of said first operator; and output the filtered measurements after applying the second transformation.

17. The sensor processing unit according to claim 16, wherein the processor is further configured to receive input from an external sensor for measuring a physical vector field which is substantially constant over time and in space in a reference frame, said external sensor being tied in motion to a moving frame, said moving frame moving in the reference frame, and wherein the processor is further operative to: apply a first transformation to the measurements of the external sensor in which the measurements are provided in the moving frame to a pseudo reference frame, with the aid of a first change-of-frame operator (R(t)) by rotation between the moving frame and the pseudo reference frame; apply a filter to the measurements thus transformed in the pseudo reference frame; and apply a second transformation, the inverse of said first transformation, to the measurements filtered by said filter with the aid of a second change-of-frame operator ($R^{-1}(t)$) by rotation between the pseudo reference frame and the moving frame, the second change-of-frame operator being the inverse of said first operator.

18. The sensor processing unit according to claim 16, wherein the processor is further configured to output the filtered measurements to an application processor after applying the second transformation.

* * * * *